United States Patent [19]
Ellis

[11] 3,873,840
[45] Mar. 25, 1975

[54] GAMMA COMPENSATED PULSED IONIZATION CHAMBER WIDE RANGE NEUTRON/REACTOR POWER MEASUREMENT SYSTEM

[75] Inventor: William H. Ellis, Gainesville, Fla.

[73] Assignee: The United States of America and represented by the Secretary of the Navy, Washington, D.C.

[22] Filed: Nov. 9, 1973

[21] Appl. No.: 414,490

[52] U.S. Cl.............. 250/392, 250/374, 250/390
[51] Int. Cl............................ G01t 3/00, G01t 1/18
[58] Field of Search .......... 250/374, 375, 385, 388, 250/390, 391, 392

[56] References Cited
UNITED STATES PATENTS

| | | | |
|---|---|---|---|
| 2,986,636 | 5/1961 | Carlson et al...................... | 250/385 |
| 3,760,183 | 9/1973 | Neissel.............................. | 250/390 |

*Primary Examiner*—Archie R. Borchelt
*Attorney, Agent, or Firm*—R. S. Sciascia; J. W. Pease

[57] ABSTRACT

An improved method and system of pulsed mode operation of ionization chambers in which a single sensor system with gamma compensation is provided by sampling, squaring, automatic gate selector, and differential amplifier circuit means, employed in relation to chambers sensitized to neutron plus gamma and gammaonly to subtract out the gamma component, wherein squaring functions circuits, a supplemental high performance pulse rate system, and operational and display mode selection and sampling gate circuits are utilized to provide automatic wide range linear measurement capability for neutron flux and reactor power and wherein neon is employed as an additive in the ionization chambers to provide independence of ionized gas kinetics temperature effects, and wherein the pulsed mode of operation provide independence of high temperature insulator leakage effects.

8 Claims, 15 Drawing Figures

PIC SYSTEM FOR GAMMA COMPENSATION

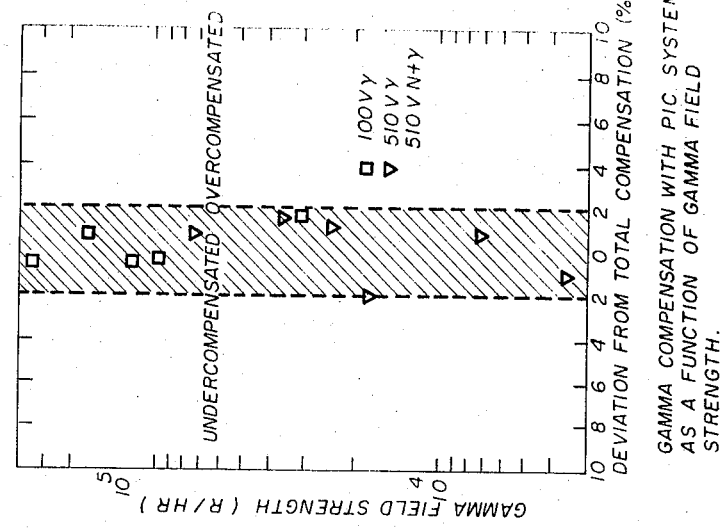
FIG. 5 GAMMA COMPENSATION WITH PIC SYSTEM AS A FUNCTION OF GAMMA FIELD STRENGTH.
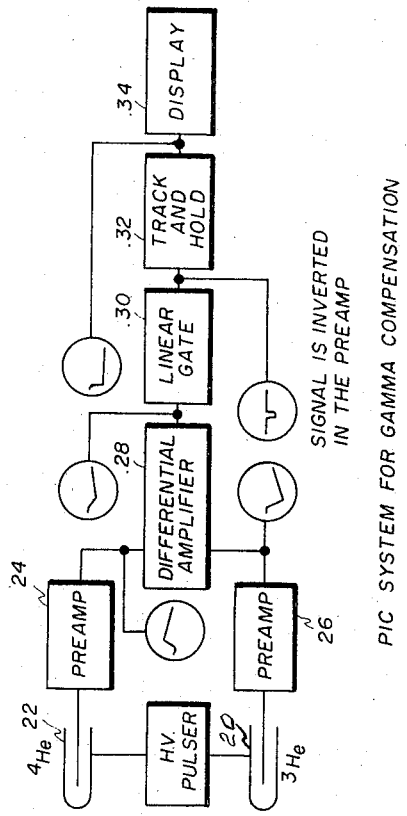
FIG. 1 PIC SYSTEM FOR GAMMA COMPENSATION

FIG. 12 MOSFET SWITCH DRIVER

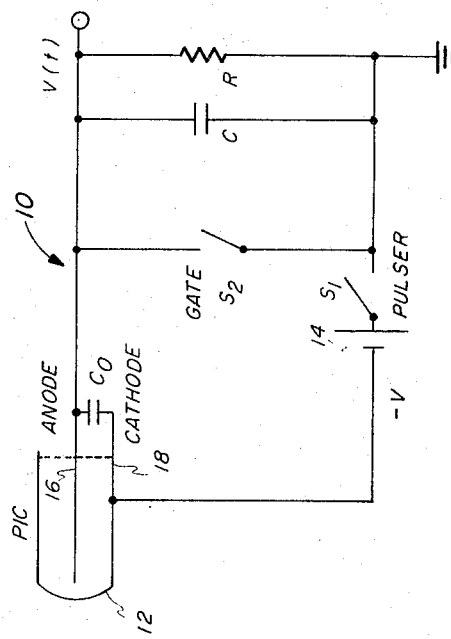
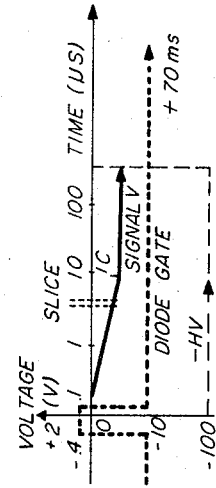
FIG. 7a
FIG. 7b
PULSED IONIZATION CHAMBER EQUIVALENT CIRCUIT WITH SIGNAL VOLTAGE PULSE PROFILE.
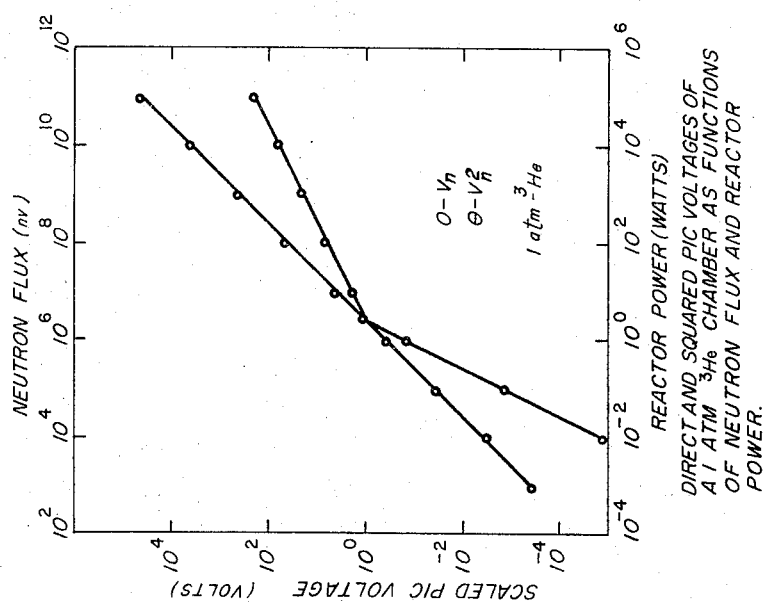
FIG. 6
DIRECT AND SQUARED PIC VOLTAGES OF A 1 ATM $^3$He CHAMBER AS FUNCTIONS OF NEUTRON FLUX AND REACTOR POWER.

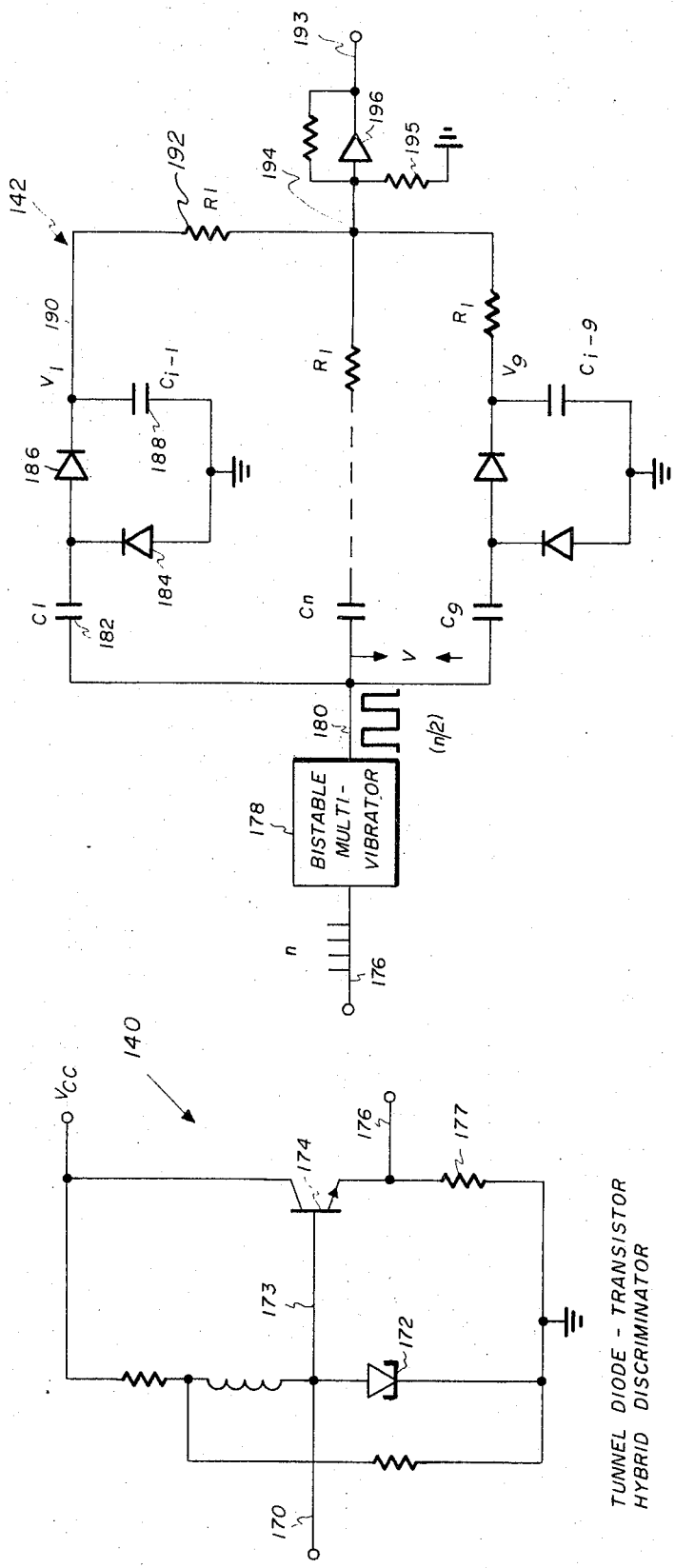
FIG. 11b  LOGARITHMIC PULSE RATE METER
FIG. 11a  TUNNEL DIODE - TRANSISTOR HYBRID DISCRIMINATOR 3,873,840

GAMMA COMPENSATED PULSED IONIZATION CHAMBER WIDE RANGE NEUTRON/REACTOR POWER MEASUREMENT SYSTEM

BACKGROUND OF THE INVENTION

The invention is in the field of nuclear energy and more specifically in the area of measurements and controls relating to ionization chambers, gas filled chambers, etc.

Gas filled chambers have been extensively applied for neutron flux and reactor power measurement and control, and at present, are the principal type of neutron sensor system for such applications. The previous and current modes of operation of ionization of gas filled chambers that have been used for such purposes have taken the form of steady state ionization current operation, pulse rate modes in which chambers are operated in the ion chamber or proportional modes, and more recently the so-called Campbelling technique of operation. Each of these modes, other than the Campbelling technique, have their own unique limitations which restrict their use to fairly narrow ranges of reactor operation.

The pulse mode, ion chamber and proportional, is restricted to lower ranges of neutron flux and reactor power applications due to the necessity that, for proper operation, their responses to neutron interactions must be separated in time sufficiently to preclude the occurrence of two or more events within the resolving time of the electronic circuitry used with the sensor. (The pulse mode, however, does afford a high degree of gamma field discrimination capability, making it a most useful mode of operation.) Until recently the restriction limited this mode of operation to flux levels less than approximately $10^3$nv and pulse rates of less than approximately $10^5 sec^{-1}$, where nv is the product of the neutron density (neutrons/$cm^3$) and the average neutron velocity (cm/sec), and directly relates to the average neutron flux density (neutrons/$cm^2$-Sec). More recently, however, improvements in nuclear discriminators, counting and pulse rate systems and chamber charge collection times, have extended this range up to approximately $10^7$pulses/sec and fluxes of approximately $10^6$nv.

Classically, for higher ranges of neutron flux, mean level ionization current modes of operation of ionization chambers have been used for reactor operation, where, in the lower portion of this range, compensation techniques had to be applied to remove the influence of core fission product gamma rays. Such ionization chambers were, and are limited in the lower flux ranges by insulation leakage currents and detector and cable noise. Such leakage currents become prohibitive at higher operating temperatures, even at flux levels of $10^9$nv for temperatures in the neighborhood of 1000°F. The current mode of operation is limited at higher flux levels by electron-ion and ion-ion recombination processes, which alters the linear current-flux relationship, limiting the applicability of such systems in higher flux measurement applications.

Most recent developments have led to a simplification of the above scheme by extending the range of the pulse operation of the fission chamber somewhat, up into the intermediate range, and by adoption of the Campbelling technique to the fission chamber, has allowed it to be used for measurements extending into the power range of operation. The Campbelling technique utilizes the root-mean square deviation of the current signals from the fission ionization chamber to derive a response proportional to the neutron flux density and takes advantage of the fact that the output signals due to fission fragment ionization events are considerably larger than those due to gamma ray interactions, to accomplish gamma ray discrimination. With this scheme, the number of sensors are reduced from four to two (the $BF_3$ proportional and the fission ion chamber), affording considerable reduction in the total number of sensors and separate instrumental systems necessary for their operation. However, some difficulties are still encountered with the system last described. Discontinuities may be experienced in regions where change-overs from one mode of operation to the next occurs. Also, the Campbelling technique is still an ion chamber mode of operation and thus suffers from high temperature induced leakage current noise and the recombination effects, that occur with ion chamber operation at higher radiation field intensities.

The next step in prior art development is the basis "Pulsed Ion Chamber Mode of Operation," referred to as PIC. The operation of the PIC system consists of repetitively pulsing a single polarity high voltage collection potential across the gas filled electrode gap of an ionization chamber exposed to an ionizing radiation field, while allowing sufficient time between pulses for the ionization density in the gas filling of the chamber to build up to its asymptotic steady state limit, and observing the voltage signal that develops across the anode load impedance.

Limitations and disadvantages of the above described prior are or PIC system reside in several areas as follows.

The basic PIC system lacks means for "gamma field" compensation or discrimination capability which is an essential characteristic for reactor neutron flux/power measurement systems.

Also, in the basic PIC system the normal, unmodified quadratic dependence of the PIC voltage signal on the ionization source intensity (neutron flux/power or gamma field intensity) is considered to be inconvenient and impractical for routine radiation field and power level measurement applications and was found to preclude development of gamma field compensation for neutron flux levels (gamma field intensities) greater than approximately $10^6$ nv ($10^6$ R/hr) where R is roentgens.

Further, in conventional PIC mode operation with the common ion chamber fill-gas compositions, i.e., He—$Co_2$, He—$N_2$ and Ar—$N_2$, there was involved a temperature dependent shift of the output voltage signal due to an inverse temperature dependence of the ionization loss coefficient characteristic of the gas composition.

It is an object of this invention to provide an improved PIC system in which each of the above mentioned limitations and disadvantages are eliminated and in which also additional concepts and techniques are provided extending neutron flux/reactor power measurement range and automatic operational control.

SUMMARY OF THE INVENTION

The invention provides for the differentiation and subtraction of voltages representative of neutron plus gamma and gamma-only signals to provide gamma field compensation; a voltage signal squaring function and appropriate switching networks for automatic full-range, linear gamma compensated response; the provision of neon gas additive in the chambers to provide temperature independence of their ionization loss coefficient and the desired temperature independent PIC mode operation, the use of the gammaonly sensitive region of the compensated chamber for extending the neutron flux/reactor power measurement range above approximately $10^{13}$ and into the $10^{15} - 10^{16}$ nv range, and operational and display mode selection and sampling gate circuits to provide completely automatic operation of the system over its full range capability; and the assemblage of electronic functional components to provide full range 18-decade logarithmic display of neutron flux/reactor power response.

DESCRIPTION OF THE DRAWING

FIG. 1 is a block diagram of a PIC system incorporating the invention and providing gamma compensation;

FIG. 5 is a chart deviation from total compensation with PIC system as a function of gamma field strength and is provided to aid in explaining the gamma compensation improvement;

FIG. 6 is a graph of the interrelation of two curves, each showing voltage and reactor power in the first and second power regions, and is provided to show the linearization of voltage readings by using direct and squared PIC voltages;

FIGS. 7a and 7b show respectively a pulsed ionization chamber equivalent circuit and a signal voltage pulse profile and are used to explain the general operation of the basic PIC system and to illustrate a pulser and charging network shown in block form in FIG. 2;

FIGS. 11a and 11b are schematic diagrams of circuits showing details of circuits suitable for a fast discriminator circuit and a logarithmic ratemeter circuit shown in block form in FIG. 2;

FIG. 12 is a schematic showing details of a circuit suitable for serving as the driver circuit for MOSFET (metal-oxide semiconductor field-effect transistor) sampling switches appearing in FIGS. 2, 3 and 8.

DESCRIPTION OF THE PREFERRED EMBODIMENTS

Figure 2:
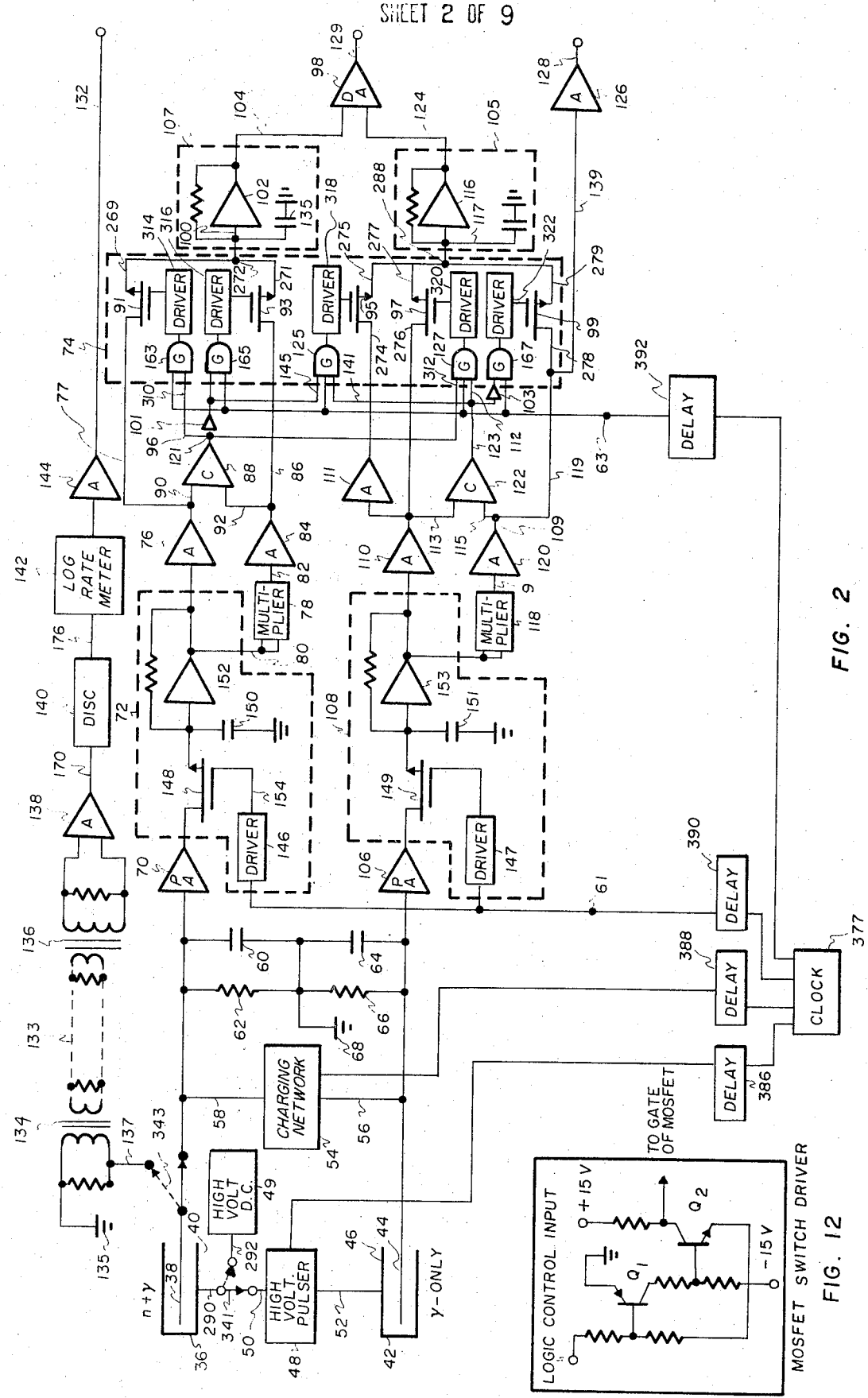
FIG. 2 is a schematic and logic circuit diagram of a pulse rate-pulsed ion chamber wide range linear neutron flux/reactor power measurement system incorporating the invention including features of gamma compensation, squaring circuit linearization, and high performance pulse rate complementation range extension.

In the conventional basic PIC (pulsed ionization chamber) system operation consists of repetitively pulsing a single polarity high voltage collection potential across the gas filled electrode gap of an ionization chamber exposed to an ionizing radiation field, while allowing sufficient time between pulses for the ionization density in the gas filling of the chamber to build up to its asymptotic steady state limit, and observing the voltage signal that develops across the anode load impedance. The pulsed mode of operation can be conveniently described with the use of an equivalent circuit 10 for the PIC system as shown in FIG. 7a. The circuit comprises an ion chamber 12 having an inner electrode capacitance $C_o$, a high voltage pulser represented by a battery 14 and switch $S_1$, a biased diode charging network represented by the switch $S_2$ which provides a low impedance path to ground, and an anode circuit load impedance, shown as shunt capacitance C and resistance R. The anode and cathode of the chamber 12 are indicated respectively at 16 and 18. Just prior to pulsing the collection potential across the chamber electrodes (equivalent to closing switch $S_1$ between the battery 14 and the cathode 18), a forward bias potential is applied to the diode in the charging network (equivalent to closing the switch $S_2$), to provide a low impedance path to ground for the transient of the leading edge of the high voltage pulse. After the chamber 12 is completely charged, the diode is reverse biased (equivalent to opening switch $S_2$), restoring the anode circuit to its original high impedance state. The current due to electron motion in the chamber and collection at the anode can then be integrated across the capacitance C, resulting in the development of a linearly increasing voltage signal $v(t)$ across the anode load, as shown in FIG. 7b. The resulting voltage pulse whose amplitude at total electron collection has been shown analytically and experimentally to be directly related to the asymptotic steady state ionization density of the chamber $N_s$, can be amplified, digitized, stored in a multichannel analyzer, or directly displayed on an oscilloscope or a directreading or digital voltmeter. The PIC system as described above is the basic conventional system, the improvements of which constitute the subject invention, and is provided for a better understanding of the invention to be described hereinafter.

Referring now to FIG. 1, there is shown in block form a PIC system incorporating the invention and illustrating the improvement of gamma compensation.

Since the PIC system response is a function of the total ionization source level, either neutron or gamma, or both averaged over the growth period of the ionization density (~100 ms), gamma discrimination techniques are not applicable for the pulsed mode. Rather, one has to resort to compensation techniques where one utilizes a gamma-only sensitive region, whose signal can be subtracted from that of the neutron plus gamma sensitive chamber signal. Pulse subtraction, rather than current subtraction is necessary for the PIC system. To illustrate how this may be accomplished, a set of difference relationships can be developed between the voltage signals of two such chambers, showing, analytically, that gamma compensation should be possible both in the first and second order regions of PIC operation and that gamma influence free linear neutron responses should be possible.

In the first order region, direct subtraction of the gamma only sensitive PIC voltage $v_\gamma$ from that of the neutron plus gamma sensitive chamber $v_{n+\gamma}$ yields a gamma-influence free neutron flux dependent signal.

$$v_{n+\gamma} - v_\gamma = (S_n + S_\gamma)/a_1 - S_\gamma/a_1 = S_n/a_1 = A_1 \phi \quad (1)$$

When both chambers are operating in the second order region, subtraction of the square of the gamma-only sensitive signal $v_\gamma^2$ from the corresponding square of the neutron-plus-gamma sensitive chamber output signal $v_{n+\gamma}^2$ again yields a gamma compensated differnece signal which is linearly related to the neutron flux density.

$$v_{n+\gamma}^2 - v_\gamma^2 = (S_n + S_\gamma)/a_2 - S_\gamma/a_2 = S_n/a_2 = A_2\phi \quad (2)$$

Even for operations in which the orders of the kinetics of the two chambers differ, a compensated linear difference relationship can be obtained. Subtraction of the direct voltage signal of the gamma only sensitive chamber $v_\gamma$ from the square of the signal from the neutron plus gamma sensitive chamber $v_{n+\gamma}^2$ yields the appropriate linear relationship $$v_{n+\gamma}^2 - mv_\gamma = (S_n + S_\gamma)/a_2 - mS_\gamma/a_1 = S_n/a_2 = A_2\phi \quad (3)$$

where $m = a_1/a_2$ is a scaling factor of the order of $10^{-2}$.

A system incorporating the above techniques for the initial experimental evaluation of the difference method for gamma compensation with the PIC mode of operation (see FIG. 1) utilized the first order kinetics region of operation of a matched pair of cylindrical ionization chambers 20 and 22 filled respectively with 1 atm $^3$He (neutron-plus-gamma sensitive) and $^4$He (gamma-only sensitive) gases. The two-chamber system, operated in the pulse mode, was expsed to a 400Ci $^{60}$Co gamma source (~5 × $10^5$(R/hr) gamma field) and neutrons from a 10Ci Pu-Be neutron source, thermalized in a paraffin cube. The two signals derived from the chambers were amplified via preamplifier 24 and inverter preamplifier 26 and added in a differential amplifier 28. The difference signal from the differential amplifier 28 was sampled at its maximum amplitude with a linear gate 30 and this signal was then used to drive a track-and-hold (T&H) module 32, which sampled the linear gate signal at its maximum amplitude and held this voltage until the nex pulse arrived at the T&H input. (Details of a unit suitable for T&H module 32 is shown at 72 in FIG. 2 and described hereinafter.) The voltage level of the T&H 32, which was displayed with both a conventional volt-meter and an oscilloscope screen 34, was found to be relatively free of gamma field influence.

The degree of compensation attained with the two-detector system, operated in the first order region, is illustrated in FIG. 5, where the deviation from total compensation is plotted as a function of the gamma field strength. Over the full range of gamma field strength used, deviations, of no greater than ± 2 percent (98 percent compensation) were observed. For field strengths of approximately $10^5$(R/hr) or greater, the maximum deviation observed was approximately ± 1 percent, or approximately 99 percent compensation.

Considering analytical relationships the PIC voltage signal amplitude $v(t_c)$, at the time of total electron collection $t_c$, for large values of the anode circuit RC time constant and coaxial eletrode geometry, has been shown analytically and experimentally to be directly related to the uniformly distributed, asymptotic steady state ionization density $N_s$ of the chamber gas filling, i.e., $$v(t_c) = Mg_c N_s, \quad (4)$$

where $$g_c = -(eU/C)(1 - (1/2 \ln(b/a))) \quad (5)$$

In equation (4), $M$, the gas multiplication factor, is unity for chambers operated in the ion chamber saturation collection potential region, which is the normal mode for the PIC system. However, it can become much larger than unity as the high voltage is increased above the saturation region, but maintains its proportionality up to rather high values of the collection potential. The parameter $g_c$ is a constant of the chamber geometry, where $U$ is the senitive volume of the chamber, $C$ is the anode circuit capacitance, and $b/a$ is the outer to inner electrode radii, respectively.

The steady state ionization density $N_s$ relates to the intensity of the radiation ionization source $S$ through applicable ionized gas kinetics equations for the particular gas in use as follows, $$dN/dt = S - \Sigma \alpha_r N_s^r - 0 \text{(at steady state)}, \quad (6)$$

where the $\alpha_r$'s are the $r$-th order ionization density loss coneefficients. The source ionization rate $S$can be considered as consisting of two components; that due to neutron produced interactions $S_n$ and that due to gamma rays and other sources of radiation within the sensitive volume of the chamber, $S_r$ $$S = S_n + S_r, \quad (7)$$

where the neutron source is given by $$S_n = (\sigma N_a \bar{E}/w)\phi, \quad (8)$$

and that for gamma rays and other ionizing sources takes the form $$S_r = G_r I_r. \tag{9}$$

In equation (8) $\sigma$ is the neutron interaction cross section, $N_a$ is the atom or surface density of the neutron sensitive material, $\overline{E}$ is the average energy deposited within the sensitive volume $U$ of the chamber by neutron reaction products, $W$ is the average energy required to produce an electron-ion pair, and $\phi$ is the neutron flux density in the vicinity of the chamber. The systematics of three possible nuclear ionization sources that could be used or encountered in reactor applications of the PIC mode are shown in Table 1 below.

Table 1 Nuclear Ionization Sources $^3$He $(n,p)t$   $Q = 0.764$ MeV, $\sigma = 5400\ b$
$^{10}$B$(n,\alpha)^7$Li   $Q = 2.78$ MeV, $\sigma = 3840b$
$^{235}$U$(n,f)$F.F.   $Q = 200$ MeV $\sigma = 590\ b$, $\overline{E} = 80$ MeV
350Ci $^{60}$Co source, (1.17 1.33 MeV. gammas)
  (Most ionization of gas is due to P.E. and Compton Effect promoting electrons from wall.)
$S = \sigma N_a \phi \overline{E}/w$ (iron pairs/cm$^3$-sec)
$w_{He} = 42.2$ eV/ion pair
$w$(Ar and $N_2$) $= 27$ eV/ion pair
$w$He-CO$_2$) $= 34$ ev/ion pair In equation (9) the parameter $G_r$ is effectively a gas ionization efficiency factor for radiation fields other than neutrons and is a constant for a given radiation field and chamber configuration, allowing the gamma or beta ionization source $S_r$ for a given system to be linearly related to the source intensity $I_r$.

At steady state and for neutron flux densities of up to $\gtrsim 10^{16}$nv, equation (6) reduces to a quadratic in terms of the ionization density $N_s$, $$\alpha_1 N_s + \alpha_2 N_s^2 = S \tag{10}$$

which should assume a direct relationship for low source intensities, where first order loss mechanisms predominate.

$$\alpha_1 N_s = S \tag{11}$$

However, at much higher source ionization rates and higher ionization densities, the kinetics relationship is expected to become second order with the ionization source rate dependence of the ionization density also becoming second order, i.e., $$\alpha_2 N_s^2 = S \tag{12}$$

Intermediate between the two regions where neither first nor second order losses dominate, there is a transition region for which the source ionization rate dependence of the ionization density should be given by $$N_s = -(\alpha_1/2\alpha_2) \pm \{(\alpha_1/2\alpha_2)^2 + S/\alpha_2\}^{1/2} \tag{13}$$

The ionization density level at which this transition occurs is determined by the value of the ratio of the two loss coefficients $\alpha_1/\alpha_2$, and these are in turn determined by the gas composition, temperature, and pressure, as well as the chamber electrode spacing in the case of $\alpha_1$.

Substituting the steady state ionization density dependence of equation (4) into equation (10) yields an equivalent quadratic form for the observed PIC voltage signal $v_s$ dependence on the source ionization rate $S$, i.e., $$a_1 v_s + a_2 v_s^2 + \ldots = S, \tag{14}$$

$a_1 = \alpha_1/Mg$, and $a_2 = \alpha_2/M^2 g^2$

When the neutron flux component of the radiation field and its ionization source rate in the chamber is much larger than that due to gamma rays and other sources for ionization of the chamber gas, the voltage relationship in equation (14) will vary as the neutron source, such that at low neutron fluxes, the first order term in the equation will predominate and the PIC voltage signal $v_s$ will be directly related to the neutron flux $\phi$, $$v_{n1} = S_n/a_1 = A_1 \phi,$$

where $$A_1 = (\sigma N_a \overline{E}/a_1 W) \tag{15}$$

However, for higher neutron fluxes and source ionization rates, the second order term will become dominant, so that the square of the PIC voltage will then be directly related to the neutron flux $\phi$, $$v_{n2}^2 = S_n/a_2 = A_2 \phi, \tag{16}$$

where $$A_2 = (\sigma N_a \overline{E}/a_2 W)$$

Thus, for higher neutron fluxes, where the ionized gas kinetics become second order, the neutron source and flux density dependence of the PIC voltage assumes a square root relationship.

$$v_{n2} = (S_n/a_2)^{1/2} = (A_2 \phi)^{1/2} \tag{17}$$

The same type of relationships hold for the gamma ray response of PIC system.

$$v_{\gamma 1} = S_\gamma /a_1 = G_\gamma\ I_\gamma\ /a_1 = B_1 I_\gamma \tag{18}$$

(First Order)

$$v_\gamma{}^2 = S_\gamma /a_2 = G_\gamma\ I_\gamma\ /a_2 = B_2 I_\gamma \tag{19}$$

(Second Order)

An equation for the first and second order dependence shown above can be written in general $r$-th order form as follows, $$v_{sr} = a_r S^{1/r} = a_r (S_n + S_\gamma)^{1/r} = a_r (A_r \phi + B_r I_r)^{1/2}, \tag{20}$$

or in a convenient logarithmic form for graphical presentation or interpretation, $$\log v_{s,r} = (1/r) \log (A_r\phi + B_r I_\gamma) + \log a_r \quad (21)$$

The theory suggested above in the analytical study set forth has been demonstrated experimentally as shown in FIG. 6. In FIG. 6 the direct $V_n$ and the squared $v_n^2$ PIC voltage characteristic of a 1 atm (atmosphere) $^3$He chamber are combined to yield eight decades of linear dependence for the reactor power/neutron flux (from $10^3$ to $10^{11}$ nv) for measurements. The upper limit of these measurements are not necessarily inherent to the system but are indicative of the maximum flux available with the particular reactor used at the time of the measurement. The lower limit was set by the signal to noise performance of the non-optimized pulsed system that was used for the measurements.

Applying the techniques expressed above and in accordance with further aspects of the invention, a system is provided, as shown in FIG. 2, which can accomplish compensation in the first, second and mixed order regions, and at the same time yield a linear response for neutron flux/reactor power throughout PIC operation capability. In FIG. 2 the system comprises a matched pair of compensation chambers; a conventional PIC charging network and anode load impedance; a switching network employing direct readings, squared readings of neutron flux related voltages and direct and squared voltages relating to gamma ray response and various combinations thereof; and a high performance pulse rate system for increased wide range capability.

In FIG. 2 the chambers mentioned are chamber 36 with anode at 38 and cathode at 40 and constructed as a neutron plus gamma chamber, and chamber 42, a gamma only chamber having an anode 44 and cathode 46. Operation of the chambers is effected in the conventional PIC mode as described in detail above in relation to FIG. 7a. Thus, a high voltage pulser 48 is provided connected to the cathodes 40 and 46 by lines 50 and 52. A charging network 54 is connected to the anodes 38 and 44 by lines 58 and 56 and anode load impedances in the form of capacitor 60 and resistor 62 for anode 38, capacitor 64 and resistor 66 for anode 44, and the common ground 68.

From the neutron plus gamma chamber 36 the anode voltage is amplified in a preamplifier 70, sampled and held in a T&H circuit 72 and then directly applied as one input to a routing gate 74 via an amplifier 76 and line 77. At the same time a squared value of the sampled voltage is obtained from a squaring circuit 78 having an input via line 80 from the T&H circuit 72 and passing its output via line 82, amplifier 84 and line 86 as a second input to the routing circuit 74. A comparator discriminator 88 is provided to receive inputs from amplifiers 76 and 84 via lines 90 and 92 and to provide via lines 96 and 310 an input to routing gate 74, which input logic level state is indicative of whether or not the direct reading voltage from amplifier 76 exceeds or falls below that of the squared voltage value from amplifier 84. The routing gate is operated in response to the logic level state to pass an input to a differential amplifier 98 via line 100, amplifier 102 and line 104 representative of either a direct voltage reading or a squared voltage reading, depending upon comparator discriminator controlled position of the routing gate 74. Details of the routing gate circuit 74 will be described in detail hereinafter. Its description at this point could divert attention from the continuing description of the overall circuit.

Figure 3:
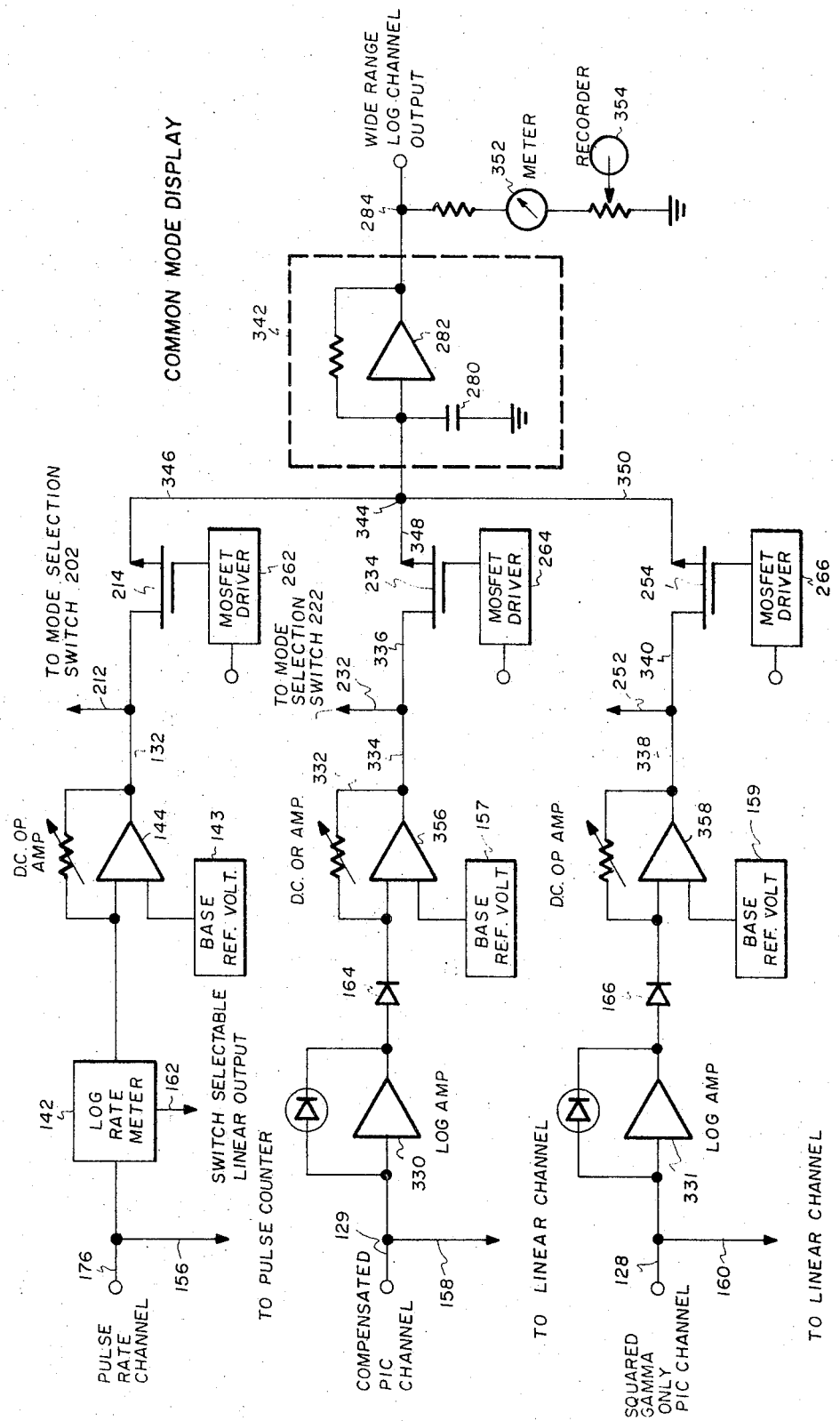
FIG. 3 is a schematic circuit diagram of block components of FIG. 2, including a hybrid discriminator and a logarithmic pulse rate meter for providing linear to logarithmic response conversion, response range matching with overlap, and response range combination into a single continuous 18-decade logarithmic response for neutron flux/reactor power measurement, display and control for application of the invention.
Figure 8:
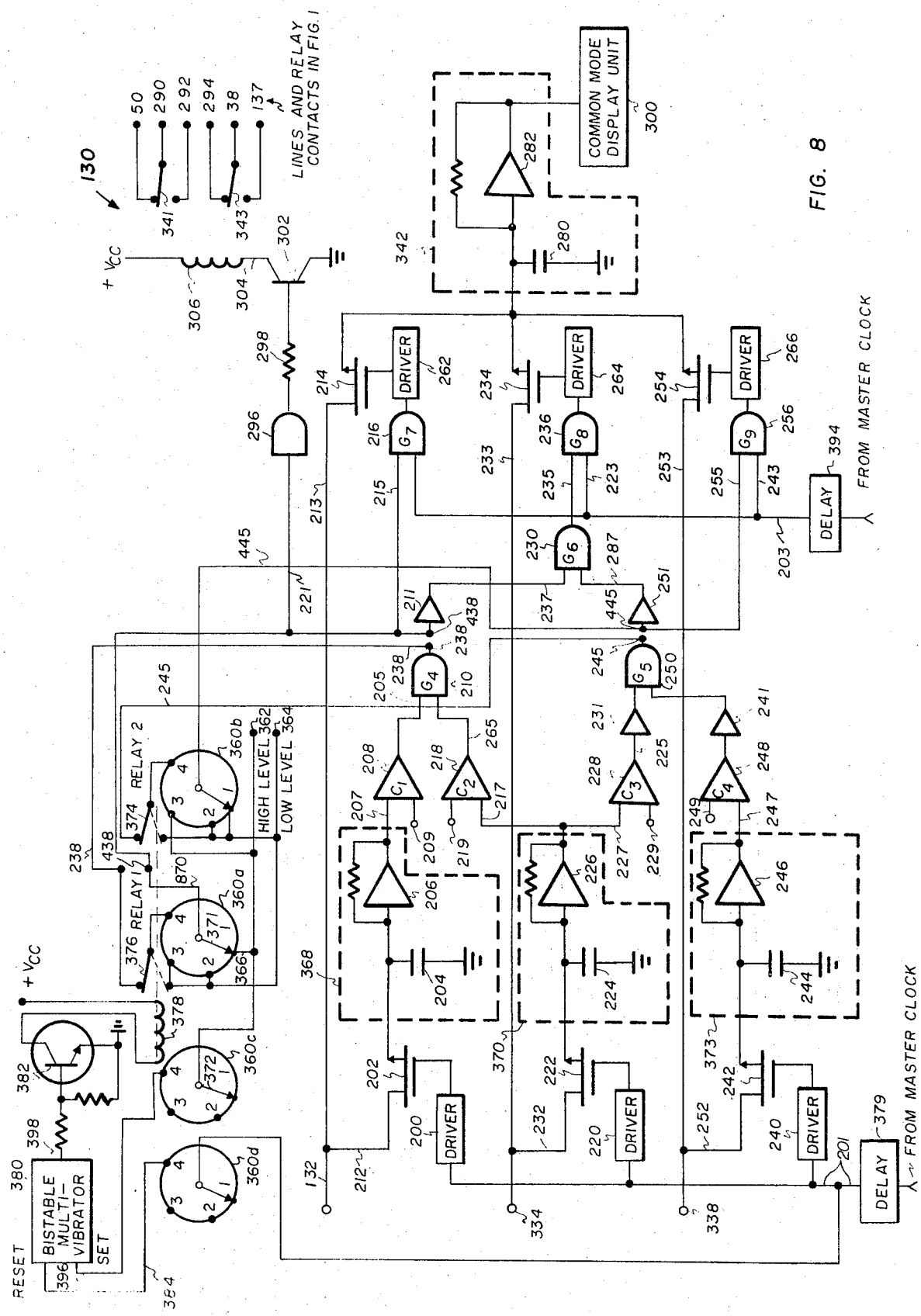
FIG. 8 is a schematic circuit diagram of an automatic control system incorporating those features of the invention associated with operational and display mode selection and control, including operational range control by input voltage level comparison, mode selection and control gating and mode display input selection gating for automatic control of the operation of the invention.

The portion of the switching network connected to the gammaonly chamber 42 contains identical elements and operates in the same way as the elements described above in relation to chamber 36, and provides a second input into the differential amplifier 98. Thus, a direct voltage reading is obtained via a preamplifier 106, T&H, circuit 108, amplifier 110, routing gate 74, amplifier 116 and line 124 to differential amplifier 98. A squared voltage reading is obtained via the preamplifier 106, the T&H circuit 108, a squaring circuit 118, an amplifier 120, routing gate 74, amplifier 116, and input line 124 to differential amplifier 98. A comparator discriminator 122 is provided and connected as shown to operate the routing gate 74. In addition to the above, the network connected to the gamma-only chamber 42 includes an amplifier 126 connected via lines 139, 119 and 109 as shown to receive the amplified output of the squaring circuit 118 and apply the same as a second input via a line 128 and logarithmic conversion means (FIG. 3) to an operational mode selector switching means 130 shown in FIG. 8 via line 338 (FIGS. 3 and 8). The first input to the selector switching means 130 (FIG. 8) is via a line 129 FIG. 3, a logarithmic conversion means including elements 330 and 356 and line 334, FIGS. 3 and 8, from the differential amplifier 98 and a third input is via a line 132 from a high performance pulse rate system which will be described hereinafter.

Considering now details of the structure and operation of the routing gate 74 in relation to the portions of FIG. 2 already described, it follows that from the neutron plus gamma chamber 36 the anode voltage is amplified in the preamplifier 70, sampled and held in the track and hold circuit 72 and then directly applied via amplifier 76 and line 77 to a MOSFET sampling switch 91. The same signal, i.e., the output of amplifier 76, is also applied via line 90 as one of the inputs to comparator, differential discriminator, 88. At the same time a squared value of the sampled voltage is obtained from the squaring circuit 78 receiving an input via line 80 from the T&H circuit 72 and passing its output via line 82, amplifier 84 and line 92 as a second input to comparator circuit 88. The same signal, i.e., the output of amplifier 84, is applied via line 86 to the input of MOSFET sampling switch 93.

The difference discriminator, comparator 88 is equipped to receive a direct voltage signal input from amplifier 76 via line 90 as one of its inputs, and a squared value of the sampled voltage as an input from amplifier 84 via line 92 as the second input and provide a logic state output indicative of whether or not the amplitude of the direct voltage signal input at line 90 exceeds that of the squared signal input at line 92, i.e., a high state logic level when the direct input exceeds the squared, and vice versa, a low state logic level when the squared signal exceeds the direct signal. Comparator 88 provides a logic state level input to one of the inputs of each of AND gates 163, 165, 125, and 127, direct to gates 163 and 127 but indirectly to gates 165 and 125 via a state inverter 101. The state inverter 101 functions to receive either high or low state logic level inputs from comparator 88 at note point 121 and to provide the inverse state level as inputs to AND gates 165 and 125. The AND gates 163, 165, 125 and 127 function to receive logic state level inputs from comparator 88 at one of their inputs (direct for gates 163 and 127, and indirectly via state inverter 101 for gates 165 and 125) and high level logic pulse inputs from the pulse sequence system "clock" 377 at their other inputs via common line 63. In the case of gate 125, a direct input from comparator 122 of the gamma-only channel is received. The AND gates 163, 165, 125 and 127 provide a high level logic pulse input to their respective MOSFET driver circuits 314, 316, 318 and 320, in coincidence with the system clock pulse input, if and only if their other inputs are preconditioned to high level by the output state of comparators 88 and 122, and the state inverter 101 in the case of gates 165 and 125. A MOSFET driver circuit 314 (see suitable circuit diagram in FIG. 12) is equipped to receive a positive going input pulse from AND gate 163 and to provide an input to the gate of MOSFET switch 91, which changes from its normal −15 volt "off" level to a +15 volt "on" level. The MOSFET switch 91 is connected to receive a voltage signal input from the direct neutron plus gamma PIC channel via amplifier 76 and line 77 and at its gate input an input from driver circuit 314, which, when going from its normal −15 volt (normally open) operating level to its +15 volt pulsed level, at which the switch is closed, coupling its input 77 with its output line 269. This provides an input on line 269 to be multiplexed with a similar output on line 271 from MOSFET switch 93 at node point 272, which becomes the input of the neutron plus gamma channel output circuit T&H circuit 107 comprised of capacitor 135 and operational amplifier 102.

The operation of driver circuit 316 and MOSFET switch 93 is identical with that described for driver 314 and MOSFET switch 91. Either one or the other, when properly gated, acts as the sampling switch for the multiplexed input, node point 272, to the neutron plus gamma T&H circuit 107 comprising capacitor 135 and operational amplifier 102. Thus, when the amplitude of the direct voltage signal input to comparator 88 at input line 90 exceeds that of the squared input at line 92, the resulting high level at the output of comparator 88, serving as the input to AND gate 163, conditions this gate so that when its other input is pulsed by the system "clock" 377 via common input 63, it provides a positive going voltage signal to the input of switch driver 314, allowing the driver output to close MOSFET sampling switch 91, thereby passing the direct voltage signal from the neutron plus gamma PIC channel to be sampled, held on capacitor 135 and applied as one of the inputs of differential amplifier 98 via operational amplifier 102. At the same time state inverter 101 inverts its high level input at node 121, into a low level input to one of the inputs of AND gate 165, deactivating the gate, and holding its output in a low level state, thereby leaving driver circuit 316 output as its normal −15 volt state and MOSFET sampling switch 93 open, thereby blocking the transfer of squared signal voltage from input 86 of switch 93 to input 272 of the T&H circuit 107. However, when the amplitude of the squared voltage signal input to comparator 88 at line 92 exceeds that of the direct input on line 90, the output 121 of comparator 88 switches to a low level state, deactivating AND gate 163 via input 310, this leaving MOSFET switch 91 open, activating AND gate 165 with a high level to one of its inputs via state inverter 101, so that when its other input is pulsed with a high level input by the system clock 377 via common input 63, it provides a positive going pulse at the input of driver circuit 316, resulting in the closing of MOSFET switch 93, coupling switch input 86 with input 272 of the neutron plus gamma T&H circuit 107, thereby allowing the squared voltage signal to be sampled and held on capacitor 135 and transmitted via operational amplifier 102 to the neutron plus gamma input of differential amplifier 98.

The portion of the switching network 74 connected to the gammaonly chamber 42 contains indentical elements and operates in the same way as the elements described above in relation to chamber 36 and provides, a second input into the differential amplifier 98, except for the case when the neutron plus gamma chamber is operating in the second order gas kinetics region, but the gamma-only system is still in the first order kinetics region, due to the fact that the ionization level in the latter chamber may be lower than in the former. under these circumstances, to assure proper signal subtraction, in accordance with equation (3) hereinbefore, the direct gamma only signal must be scaled by a factor given in the equation. This is accomplished by the introduction of scaling amplifier 111 and MOSFET switch 95 in lieu of direct signal MOSFET sampling switch 97.

Thus, a direct voltage reading is obtained via preamplifier 106, T&H circuit 108, amplifier 110 and MOSFET sampling switch 97, multiplexed input at node 288, T&H circuit 105 consisting of capacitor 117 and amplifier 116, and then to differential amplifier 98 via line 124. MOSFET switch 97 is controlled by driver circuit 320, which in turn is operated by AND gate 127, which derives its operational state condition from inputs directly from both comparators 122 and 88 and common input line 63 from the system clock 377, MOSFET switch 97 is closed for passing a direct voltage reading to the differential amplifier 98 if and only if the outputs of comparators 122 and 88 are in their high level states, with both chambers operating in the first order kinetics region, and their direct voltage reading at the inputs of comparators 122 and 88 exceed the amplitude of the squared voltage reading inputs. However, when the neutron plus gamma channel is operating in the second order, squared input made, but the direct voltage reading for the gamma only channel on input line 113 to comparator 122 still exceeds the squared signal at input 115, indicative that the gamma only chamber is still in the first order gas kinetics region, in order to satisfy the requirements of equation (3), the low level output of comparator 88, applied directly to one of the inputs of AND gate 127, blocks this gate from closing its MOSFET sampling gate 97, but by the inverting action of state inverter 101, the low level output of comparator 88 is converted to a high level output to AND gate 125 via line 145, activating this gate to couple a scaled direct voltage reading of the gamma only channel to the input of differential amplifier 98, via scaling amplifier 111, MOSFET sampling switch 95, multiplexing node 288 and T&H circuit 105 comprising the capacitor 117 and amplifier 116.

For operation of the gamma-only channel in the second order gas kinetics region, the amplitude of the squared voltage reading appearing on line 115 at one of the inputs of comparator 122, and obtained via squaring circuit 118 and amplifier 120, must exceed that of the direct voltage reading appearing on line 113 at the other input of the comparator 122. The resulting low level output of comparator 122, appearing on line 123, and serving as a dirct input to one of the inputs of AND gates 125 and 127 via respective lines 141 and 112, deactivates these gates and holds open MOSFET sampling switches 95 and 97, blocking their inputs to the multiplexed input node 288 to the gamma-only output T&H circuit 105. However, under these conditions, comparator 122 provides a high level input to one of the inputs of AND gate 167 via state inverter 103, activating this gate to respond to high level clock pulses appearing at its other input via common input 63, thereby meeting the requirements for closing MOSFET sampling switch 99, coupling the squared voltage reading of the gamma-only channel with one of the inputs of differential amplifier 98 via the T&H circuit 105.

As a convenience reference, per se descriptions of several elements of the system of FIG. 2 described above are set forth below as follows:

Track-and-Hold Circuits

The T&H circuits 72 and 108 are comprised of MOSFET sampling switches 148, 149 with driver circuits 146, 147, charging capacitors 150, 151 and high impedance operational amplifiers 152, 153. The switch drive circuits, similar to the one shown in FIG. 12 applies either a +15 V 0r $-^+$V level to the gate input of its respective MOSFET switch, corresponding to its "on" and "off" gating requirements, respectively, depending on whether or not a positive going logic pulse has been applied to the driver input. The application of such a pulse to the input of the switch driver circuit causes the driver output to switch from its normal $-15$ V level to a +15 V level, which, when applied to the gate of the MOSFET, causes the latter to switch to its "on" state, allowing it to pass its respective input to its holding capacitor and high impedance operational amplifier.

The function to be performed by the T&H circuits 72 and 108, typical of such circuits, is to sample the output voltage of the PIC preamplifiers 70 and 106 at the maximum amplitude point of the pulses and to hold these voltages for a preselected period of time or until the next pulse occurs. The point of sample is controlled through the T&H switch driver circuits 146 and 147 by the appearance at input point 61 of gating pulses provided by the pulse sequence system. The outputs of T&H units 72 and 108, which are essentially constant levels that are updated during each new pulse of the PIC systems, are applied directly through normalizing amplifiers 76 and 110 to one side, inputs 90 and 113, of their respective comparator circuits 88, and 122, and indirectly to the other side, inputs 92 and 115, through squaring circuits 78 and 118 and normalizing amplifiers 84 and 120.

Squaring Circuits

The squaring circuits 78 and 118 have the characteristics of furnishing an output whose voltage level is proportional to the square of the amplitude of the input level. The gain of the amplifiers 76, 84, 110 and 120 at the two inputs of each of the comparators 88, 122 can be adjusted so that their levels will be equal at the point of transition from first to second order kinetics in the chamber gas filling; with that of the squared signal always being smaller than the direct input while the chamber is in the first order region, and greater than the direct signal when in the second order region.

Comparator Circuits

The difference discriminators could be either Schmitt trigger or diode circuits, but are shown as comparator units 88 and 122 in FIG. 2. Such units have two operational states which control the operation of the routing gates 74 consisting of sampling gates 125, 127, 163, 165 and 167 which respectively control MOSFET sampling switches 95, 97, 91, 93 and 99 for the system shown in FIG. 2. For the first state, that in which the direct signal at inputs 90 and 113 (reference signal) exceeds the squared signal at inputs 92 and 115, the outputs 121 and 123 of comparators 88 and 122 are in their high level (1) states. The gates are closed for transmission of the direct signal and, by use of state inverters 101 and 103, opened for the squared signals. For the second state, when the squared signal input exceeds that of the direct signal, the switch of state for the comparators (discriminators) switches the states of their outputs 121 and 123 to low level (0). The state levels of the outputs of the two comparators 88 and 122, either directly or by state inversion, establish the proper input state levels for controlling the sampling gates and providing for automatic transition between direct and squared operation of the PIC system.

The comparator modules 88 and 122, as used for the above purposes, compare the voltage levels of their direct 90 and 113, and squared 92 and 115 inputs. As long as the direct input (reference level) is above that of the squared input, which will be the case as long as the two chambers are operating in the first order gas kinetics regions, the outputs 121 and 123 of comparator units 119 and 123 will remain in their high level (1) states. However, when their inputs are equal or the squared input exceeds the level of the direct input, the case when the gas kinetics of the chambers change over to second order, the outputs 121 and 123 will switch to their low level (0) states. Should the squared input level again drop below the direct input, the output of the comparators will switch back to their high level states.

State Inverters

The inverters 101 and 103 serve the function of converting a low level to a high level, and vice versa, a high level to a low level voltage.

AND Gates

The gates 125, 127, 163, 165 and 167 used in FIG. 2 are AND type gates which follow the convention that all of their inputs must be high level (1) in order for their outputs to be in their high level states; otherwise, the outputs will be in low level states, i.e., if one or all of the inputs are low level, the outputs will be low level.

Routing Gates

The routing gates consist of MOSFET switches 91 and 93 multiplexed into a common input 272 to the T&H unit 107 consisting of holding capacitor 135 and amplifier 102 for the $n+\gamma$ chamber signals; MOSFET switches 95, 97 and 99 multiplexed into a common input 288 to the T&H unit 105 comprised of holding capacitor 117 and amplifier 116, for the gamma-only signal; and their respective sampling gate and drive circuits.

The pulse rate-pulsed ionization chamber wide-range linear neutron flux/reactor power measurement system thus far described includes (1) a high performance pulse rate channel for low level neutron flux/reactor power measurement such as would be necessary for "cold-core" reactor and start-up operation, (2) compensated linear pulsed ionization chamber channel for intermediate to high power operation, (3) a square gamma-only pulsed ionization chamber for ultra-high level neutron flux/reactor power measurement. We will now consider details of item (1) above and as item (4) the necessary level sensing, gating and control circuitry for manual or automatic selection of the appropriate channel for operation at a given level and the switching between channels as the radiation field and power level change.

Figure 4:
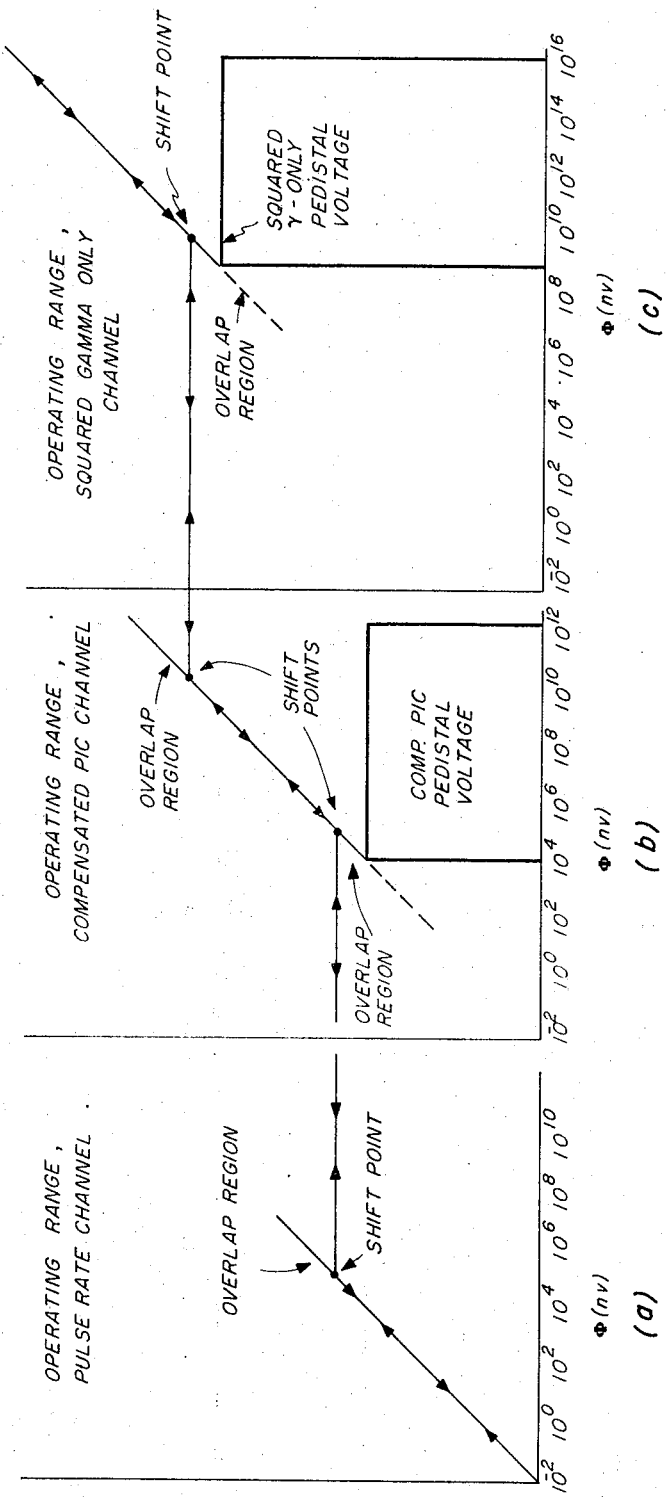
FIGS. 4a, 4b, and 4c are voltage/flux charts illustrating the operational range capabilities of the pulse rate, compensated PIC, and squared gamma-only PIC channels of the proposed system, the automatic transitions between channels of adjoining ranges and the method of combining the individual channel responses into one single continuous 18-decade logarithmic response with at least two decades of overlap between adjoining channels, and is provided to aid in explaining the 18-decade logarithmic response ranging.

The ranges of employment of the three modes of operation of the measurement system can be seen in FIG. 4. It should be noted that there is a substantial overlap between the effective ranges of the three modes: the high performance pulse rate channel gives a linear response over a range of neutron flux from $10^{-2}$ to $10^6$ nv; the compensated PIC channel measurement capability could extend over a range of $10^2$ to $10^{12}$ nv in a low gamma field environment, or from $10^4$ to $10^{12}$ nv in a gamma field of $10^6$ R/hr; the squared gamma-only PIC channel measurement range extends from a lower limit (dependent on the fission product gamma field) of about $10^{10}$ nv up to $10^{15}$ or $10^{16}$ nv. This overlap serves two functions: (1) it provides considerable lattitude in the setting of switch points for the automatic selection of the appropriate operational mode of the measurement system; and (2) it insures that the signal which triggers an automatic switch of modes is for a valid portion of the channel response.

In the description of the systems that follows reference will be made in particular to FIGS. 2, 3, 8 and 11 of the drawing.

Pulse Rate Channel

The high performance pulse rate channel, comprising elements 134, 133, 136, 138, 140 and 144 of FIG. 2, is per se conventional and is provided in complement to applicant's remaining system to complete overall system range in providing a low neutron flux measurement capability. Thus, the high performance pulse rate system is incorporated into the systems as shown in FIGS. 2, 3, 8 and 11 in order to take advantage of the low level neutron flux measurement capability that such a system has with chamber systems such as the neutron sensitive portion of the matched-pair chambers to be used with the compensated PIC system. The pulse rate system can yield an individual, as well as an integrated response for neutron interactions occurring within such a chamber system. Its applicable flux measurement range, approximately $10^{-2}$ to $10^6$ nv, not only overlap part of the lower PIC system range, but also provides an additional 4-decades of neutron flux measurement capability below the PIC system's lower limit, approximately $10^3$ nv.

The pulse transformers 134 and 136, FIG. 2, are introduced to provide current pulse coupling of the chamber anode 38 with the pulse rate system amplifier 138 in order to avoid the capacitive effect of a long length of transmission cable. The transformer coupling of the pulse rate system can be relay-switched coupled to the anode 38 of the $n + \gamma$ sensitive chamber 36 and is shown by the broken line 343 between the $n + \gamma$ chamber and the pulse transformer input line 137 to the pulse rate channel. Pulse transformer 134 couples the high impedance of the chamber anode circuit with the low impedance transmission cable 133, and vice versa, pulse transformer 136 couples the low impedance cable 133 with the high impedance input of current amplifier 138. For this mode, a constant d.c. high voltage from the high voltage power supply 49 is applied across the chamber electrodes 40 and 38 such that separation and motion of electron-ion pairs produced within the gas-filled electrode gap by individual neutron interactions with the chamber sensitive medium, produce a current pulse in the primary of transformer 134. The resulting pulse that is transmitted through the transformer coupling and low impedance transmission cable 133 is passed to the current amplifier 138 and then to the discriminator 140. For those pulses whose amplifier exceeds a preselected level, the discriminator 140 triggers and transmits a logic pulse to the logarithmic pulse ratemeter 142. The ratemeter 142 may consist of a bistable multivibrator (B/S) and diode pump circuits (DPC), or a digital ratemeter with a logarithmic amplifier output, and exhibits an output voltage whose level is proportional to the logarithm of the rate at which logic pulses appear at its input. Since the pulse rate is proportional to the neutron flux to which chamber 36 is exposed, the log ratemeter will yield an output voltage directly related to the logarithm of the neutron flux and reactor power.

As an example of suitable detailed circuitry for systems which perform the functions required of discriminator 140 and pulse ratemeter 142, shown in block diagram form in FIG. 2, the circuitry in FIGS. 11a and 11b is provided.

Thus, the low level, fast response and narrow pulse width requirements for discriminator 140 can be met by use of a tunnel diode-transistor-hybrid monostable comparator (discriminator) circuit shown in FIG. 11a, while the wide pulse rate range response requirement of the pulse ratemeter system 142 can be met by extending the range of logarithmic ratemeter systems such as those that are currently in wide use for reactor instrumentation purposes and as is shown in FIG. 11b.

The circuit diagram presented in FIG. 11a consists of tunnel diode 172 and transistor 174 coupled to form a tunnel diode-transistor discriminator (monostable comparator) hybrid circuit. When the output voltage pulse from amplifier 138, applied at input line 170 of tunnel diode 172, exceeds the critical reference voltage selected for the diode, corresponding to where the load line just clears the peak of the tunnel diode characteristic, an abrupt transition occurs in the output voltage of the diode and in the base current of transistor 174, rapidly driving the transistor into heavy conduction and causing its output at point 176 to shift states. Since the discriminator, when biased as a "one-shot," has only one stable operating state, its subsequent return to this state results in the output of the transistor also returning to its original state, yielding a narrow logic pulse output having a width of 10 to 50 nanoseconds, allowing it to respond without distortion to input pulse rates of approximately $10^7$ Hz.

The logarithmic ratemeter system 142, which is shown in functional form in FIG. 11b, consists of a bistable multivibrator input 178 to a bank of approximately 9 to 10 diode pump circuits (DPC) having a range of values for their input time constants $T_f = R_f C_f$ from approximately a nanosecond up to approximately 2 milliseconds, and discharge time constants for the tank circuits $T_t = R_t C_t$ that range from approximately a millisecond up to approximately 50 secs. The operation of the system consists of the output logic pulses of B/S 178, one for every two discriminator pulses, being applied simultaneously at all of the inputs of the DPC bank, pumping charge into each of the tank circuit capacitors $C_1 - C_9$ of the bank at an average rate given by $(n/2)(V-v_t) \times (1-e^{-T/R_t C_T})$, where n is the input pulse rate to the B/S 178, T the average period for a particular value of $n$, $V$ the voltage amplitude of the B/S 178 output, $v_t$, $R_f$ and $C_T$ the voltage across a particular tank circuit, its input resistance, and total capacitance, respectively.

Since the ratios of tank-to-feed circuit capacitances will range from approximately 50,000 at the high rate end to 10 for the low rate section, at low pulse rates, only the lower members of the DPC bank will contribute significantly to the output signal of the bank. At the high end of the pulse rate range, the tank circuits of the lower members of the bank, being completely charged, will provide an essentially constant slowly varying contribution to the output signal, while the upper members of the bank will control the DPC (diode pump circuits) response of the system to changes in pulse rate.

With proper selection of combinations of input and tank circuit time constants, where the input time constants differ by a factor of approximately 10, and summing the output currents of the tank circuits, one can obtain an output voltage E which is proportional to the log of the pulse rate from approximately 0.1 to $10^7$ Hz. For practical systems in combination with PIC operation such a wide range would not be absolutely necessary but would provide additional overlap of the useful ranges of two systems. The selection of the range capabilities necessary for either of the two systems would therefore be functions which could be used for design optimization for particular applications in which one would have considerable lattitude in circuit configuration.

The operation of a typical member of the DPC bank (FIG. 11b) can be described as follows: during each positive cycle of the output of B/S 178 (one for every two input pulses from discriminator 140) input capacitor 182 and tank capacitor 188 will be charged through diode 186 to the extent of $(V-v_t)(1-e^{-T/R_t C_T})/C_T$, where $C_T = C_f C_t/C_f + C_t$. Subsequently, with the next input pulse to the ratemeter 142, when the B/S 178 output will drop to zero, input capacitor 182 will rapidly discharge to ground through diode 184, preparing it to respond to the next positive cycle of the output of B/S 178. Tank circuit capacitor 188, discharging through resistor 192 and shunt impedance 195 of d.c. operational amplifier 196, provides its contribution to be summed at node 194 with that of the other members of the DPC tank circuit bank as the input signal for d.c. amplifier 196. Circuits associated with $C_2$ through $C_9$ are identical in arrangement to the circuit described for $C_1$ and hence the description of elements is not repeated.

In responding to the summed tank circuit currents, d.c. amplifier 196 provides at its output 193 a voltage response which is linearly related to the logarithm of the input signal pulse rate to ratemeter 142 for a pulse rate range of approximately 9 decades, from approximately 0.1 to $10^7$ Hz. For an appropriately sensitive neutron sensor, this corresponds to a neutron flux/reactor power measurement capability for the pulse rate channel from start-up through the low power range, from approximately $10^{-2}$ to $10^6$ nv. The combining of this capability with the other system modes of operation will be described hereinafter.

Compensated Linear Pulsed Ionization Chamber Channel

As is true for the pulse rate systems, the reduction of fission and activation product gamma-field influence on the derived neutron flux dependent signal shortens the wide range measurement capability of the PIC mode of operation ($10^2$ to $10^{12-13}$ nv) by raising the lower limit for which useful results can be obtained. However, by use of the matched-pair $n + \gamma$ and gamma-only sensitive chambers and associated circuitry, and the difference signal systematics described in relation of FIG. 2, much of the PIC wide range capability can be retained for the gamma compensated mode of operation, even for gamma fields of $10^6$ R/hr. The lower practical limit for neutron flux measurement with the compensated PIC system for mixed neutron-gamma fields will depend on several factors, including (1) the magnitude of the gamma field to which the chambers are exposed, (2) the relative ionization sensitivites of the chambers for neutron and gamma components, (3) system stability, and (4) system noise performance.

The relative neutron-gamma field ionization sensitivities $S_n/S_\gamma$ determined for 1 inch outside diameter by 4–6 inch length cylindrical stainless steel chambers filled with 1 atm $^3$He and $^4$He and a 1 atm $^4$He filled fission chamber of similar construction, ranged from 10 to 20 nv/(R/hr). A recently improved version of the PIC system has exhibited output signal stability of approximately ±0.3 mv. For a 10 volt output signal this would constitute a variability of only ±0.003% for each component of the matched-pair system, and approximately ±0.4 mv variability for their difference. A 10 mv difference signal, for which the ±0.4 mv variation would be an acceptable value, the neutron contribution to the total signal would be approximately $10^{-3}$. This ratio would also hold for the neutron to gamma field ratio. Thus, for a gamma field of $10^6$ R/hr and unoptimized stainless steel chambers, useful measurements should be possible for neutron flux levels of $1-2 \times 10^4$ nv, i.e., $$(10^6 \times 10^{-3} S_n)/(10^6 S_\gamma) = 10^3 (10-20 \text{ nv})/10^6 \text{ R/hr}$$
$$= 1-2 \times 10^4 \text{ nv}/10^6 \text{ R/hr}.$$

With optimization of geometry and materials, the relative ionization sensitivities possible should be reduced in favor of the neutron field component by at least a conservative factor of 10. This would permit the compensated PIC mode of operation to be utilized for neutron flux levels of $10^3$ nv, even for gamma fields of $10^6$ R/hr. This latter fact raises the possibility that for fast breeder reactors having a power operation history, where the shut-down flux levels are relatively high, neutron flux/reactor power measurements and control could be accomplished with the PIC system alone; compensated PIC from $10^3$ to $10^{12-13}$ nv and the squared gamma-only channel starting at approximately $10^9$ nv, taking the measurement capability up into the $10^{15-16}$ nv range.

First Order Operation of Both Chambers

For first order operation of both chambers, when the voltage level of the direct inputs 90 and 113 to the comparators 88 and 122 exceed that of the squared inputs 92 and 115, by convention, the comparator outputs 121 and 123 are in their high level (1) states. The high level state of the comparator outputs, when applied directly to input 310 of gate 163 and inputs 123 and 312 of gate 127 activates these gates so that with the arrival of the clock pulse at input 63 to the gates, driver circuits 314 and 320 to MOSFET sampling switches 91 and 97 will be pulsed, causing the switches to close for sampling the direct $n + \gamma$ and the gamma-only signals for charging up the holding capacitors 135 and 117 of their respective T&H units 107 and 105. The state inverters 101 and 103 in the input circuits of AND gates 125, 165 and 167 furnish a low level to hold the outputs of these gates in their low level state, deactivating them for the input of the clock pulses at input 63, so that MOSFET switches 93, 95 and 99 will remain open (off condition) and decoupled from their associated T&H units 107 and 105. The above action results in direct linear signals being sampled and applied to both inputs of the differential amplifier 98 for gamma compensation.

Second Order Operation of Both Chambers

When both chambers 36 and 42 are operating in their second order kinetics regions, where the level of the squared signals at 92 and 115 exceed that of the direct signals at 90 and 113, the comparators 88 and 122 are switched to their low level states, so that by state inversion with inverters 101 and 103 the states of the inputs to AND gates 165 and 167 are made high level, activating them so that their outputs can switch to high level with the appearance of the clock pulse at input 63, and, by pulsing the driver circuit to MOSFET sampling switches 93 and 99, cause these switches to close to "on" condition for sampling the squared $n + \gamma$ and gamma-only signals for charging up the holding capacitors 135 and 117 of their respective T&H circuits 107 and 105. The resulting low level states of one of the inputs 141, 112 and 310 of AND gates 125, 127 and 163 hold the outputs of these gates in a low level state, deactivating them, blocking the gating action of the clock pulse at input 63 so that MOSFET switches 91, 95 and 97 will remain in "off" condition decoupled from their respective T&H units. Thus the result is that the signals that are sampled and passed to the differential amplifier 98 are the squared ones, assuring a valid gamma compensated output.

Mixed Order Operation

For the case when the $n + \gamma$ chamber 36 is operating in the second order kinetics region but the gamma-only chamber 42 is still in its first order region, to assure valid subtraction of the gamma-influence, the direct gamma-only signal must be scaled by an additional factor m constituted by a constant factor ($\sim 10^{-7}$) multiplied by the ratio of the two plasma loss coefficients, i.e., $\alpha_1/\alpha_2$ ($\times 10^{-7}$) $\approx 10^{-2}$. This can be accomplished by adding an additional amplifier/attenuator unit 111 connected to the direct gamma-only channel amplifier 110 and to the input line 274 to MOSFET sampling switch 95. For the condition requiring the use of the MOSFET switch 95 channel, the output of comparator 88 will be in a low level state (the squared $n + \gamma$ signal larger than the direct), while the output of comparator 122 would be in its high level state (direct gamma-only signal larger than squared). These conditions of state for the two comparators directly deactivates AND gates 125, 127 and 163, assuring that the MOSFET sampling switches 91, 97 and 99 which they control, remain open ("off" condition) and decoupled from their respective T&H units 107 and 105 at the time when the clock pulses appear at input 63. However, AND gate 165 is activated for passing a high level pulse to the driver circuit of MOSFET sampling switch 93 by the action of inverter 101, which inverts the low level output of comparator 88 to a high level input to this gate. This and the high level output of comparator 122 also activates AND gate 125 so that when it is pulsed by the clock pulse at input 63 it will activate the driver circuit for closing MOSFET switch 95, coupling it with its respective T&H unit 105 via line 275 for sampling the "scaled" direct gamma-only signal via amplifier 111, thus assuring valid gamma influence subtraction in the differential amplifier 98 according to equation (3) hereinbefore.

Differential Amplifier

The differential amplifier 98 is of conventional design, similar to that used in oscilloscope preamplifiers, and allows the amplitude of one input to be subtracted from another. Its function in the system is to allow the gamma-only signal to be subtracted from that of the $n + \gamma$ signal, leaving a residual signal which is a function of only the neutron contribution of the $n + \gamma$ sensitive chamber output signal.

Squared Gamma-Only PIC Channel

The squared gamma-only PIC signal can be used as a measure of neutron flux/reactor power whenever the signal contribution due to prompt gamma rays associated with fission is a factor of 100 to 1 over that which comes from the core inventory of fission products. For example, for a large fission product inventory giving a gamma field of $10^6$ R/hr, the squared gamma-only PIC signal will provide the desired linear response from approximately 10]nv to $10^{15\text{-}16}$ nv. This extended linear response is possible due to two factors: (1) the prompt fission gamma field being a direct function of the core fission rate and thereby directly related to the core neutron flux density, indirectly relates the ionization rate occurring in the gamma-only chamber to the neutron flux, and (2) since at these flux levels the ionization rate in the gamma-only sensitive chamber due to prompt fission gamma rays is less than 1 percent of that due to neutron interactions in the neutron sensitive chamber, its range of valid PIC neutron flux response will extend to approximately 3 decades higher than that of the $n + \gamma$ chamber. Since, in the region of $10^9$ nv and above, the gamma-only chamber will be operating in the second order gas kinetics region, the appropriate signal to be extracted for linear neutron flux dependence will be that from squaring unit 118 of the gamma-only PIC circuit. This is shown in FIG. 2 by connection of unit 118 via line 9, amplifier 120 and lines 109, 119 and 139 directly to the input of amplifier 126.

Log Amplifiers

To accommodate and facilitate the display of the approximately 18-decade, wide-range response of the three combined measurement channels of the applicant's system, i.e., pulse rate- $10^{-2}$ to $10^7$ nv; compensated PIC- $10^2$ to $10^{12}$ nv; and squared gamma-only PIC- $10^9$ to $10^{16}$ nv, it is advantageous to convert the wide linear response characteristics of the different channels into that of a logarithmic response. This is accomplished for the pulse rate system by the use of log ratemeter 142 as described in relation to FIG. 2. The linear outputs of the other two channels can likewise be converted into logarithmic form by use of log d.c. amplifiers at their outputs. Since the 18-decade response is constituted by three separate channels, it is convenient to subdivide the full range into three regions of approximately 6 decades each, one for each channel. The 6-decade division also corresponds closely to the response capabilites of present day log amplifiers.

Functional circuit diagrams presented in FIG. 3 illustrate the manner in which the linear channel responses can be converted into logarithmic responses and then combined into an approximate 18-decade presentation. FIGS. 4a, 4b and 4c then illustrate the manner in which the three-channel responses can be combined for the 18-decade logarithmic presentation.

The pulse rate output of discriminator 140, FIG. 2 (which is linearly related to the neutron flux/reactor power) is converted by log ratemeter 142, FIGS, 2 and 3, into a voltage level at its output that is related to the logarithm of the pulse rate, thus the neutron flux/reactor power. The output of ratemeter 142 is directly coupled (FIG. 3) to d.c. amplifier 144, which is provided with an appropriate reference base voltage by module 143. Amplifier 144 provides linear gain control for determining the appropriate voltage range for the pulse rate channel input 132 to MOSFET sampling switch 214, the purpose and operation of which will be described hereinafter. Note that elements, log ratemeter 142 and operational amplifier 144 are included in FIG. 3 as well as FIG. 2. The purpose is to have the complete set of logarithmic elements in FIG. 3 for convenient description.

The linear output of the compensated PIC channel (whose response is a direct function of the neutron flux/reactor power) differential amplifier 98, obtained on line 129, serves as the input to log amplifier 330. The log amplifier 330 converts the linear flux dependence of its input into a logarithmic dependence for its output. Log amplifier 330 is coupled to d.c. operational amplifier 356 through biased diode 164 which can be used to set the lower limit of the compensated PIC system output that will be passed to amplifier 356. Amplifier 356 is provided with gain control 332 for matching the slope of its output voltage signal with that of d.c. amplifier 144 of the pulse rate channel and a base reference voltage circuit 157 for providing a reference base with which to sum with the input from amplifier 330 in order to match up the output of this channel with that from the pulse rate system and also provide an overlap region for the intercept of the two regions. The output of amplifier 356 is coupled via lines 334 and 336 to MOSFET sampling switch 234.

The squared gamma-only PIC channel signal voltage, which in the range of approximately $10^9$ to $10^{16}$ nv is linearly related to the neutron flux/reactor power, serving as the input to log amplifier 331, is treated in a manner similar to that described above for the compensated PIC channel. The signal is converted into its logarithmic dependence by log amplifier 331 and is then combined with a base level voltage from base reference circuit 159 and amplified appropriately by the d.c. operational amplifier 358 to match its slope with the outputs of the other log channels. It is finally sampled by MOSFET switch 254 via lines 338 and 340.

The MOSFET switches 214, 234 and 254 are biased to desired "on" and "off" condition by respective drivers 262, 264 and 266. The output of switches 214, 234 and 254 are connected to a common node 344 via lines 346, 348 and 350. The output from the node 344 is sampled by T&H circuit 342 which comprises an operational amplifier 282 and grounded charging capacitor 280 as shown. The output 284 of the T&H circuit 342 may be applied to indicating means such as meter 352 and recorder 354 or the output line 284 may be applied as a wide range log channel output.

Linear Flux/Power Response

For some reactor operations and control a linear response signal for flux/reactor power is desirable and can be extracted for display and presentation from each of the three channels. For the pulse rate system, pulses whose rate is proportional to the flux/power level can be picked off via line 156, FIG. 3, which connects to the output of discriminator 140, FIG. 2, and fed into a pulse counting system. Also, voltage levels proportional to the flux/power level can be obtained by switch selection from appropriate diode pump circuit ouptputs of the pulse ratemeter. As example, for the compensated PIC system, linear signals can be extracted at the output of differential amplifier 98, FIG. 2, on line 158 of FIG. 3 corresponding to output line 129 of FIG. 2. For the higher flux/power levels, signals linearly related to the flux/power level can be obtained from the squared gamma-only PIC channel on line 160, FIG. 3, corresponding to output line 128, FIG. 2.

Wide Range Log System Operation

For the wide range logarithmic system display, as illustrated in FIG. 3, the output of the pulse rate channel can be used to span the neutron flux from approximately $10^{-2}$ to $10^5$ nv, the compensated PIC output can be used to span the range from approximately $10^5$ to $10^{10-11}$ nv, and the squared gamma-only PIC channel output can be used to span from approximately $10^{10-11}$ to $10^{15-16}$ nv, with each channel providing additional response range capability, representing for each transition region greater than two decades of overlap. For operation in the neutron flux/power range depicted in FIG. 4a, the log response for the pulse rate channel is obtained by sampling the output of d.c. amplifier 144 (FIG. 3) via MOSFET switch 214, and T&H circuit 342 which includes holding capacitor 280 and operational amplifier 282 for displaying, recording and/or operation of reactor control systems. The switch-over point to compensated PIC channel operation is indicated at approximately $10^5$ nv and is determined and controlled by the setting and operation of the mode selection and control system to be described in detail hereinafter in relation to FIG. 8. The operation in the compensated PIC channel region is shown in FIG. 4b. The logarithmic response for this channel is obtained from the output of d.c. amplifier 356 and is sampled by MOSFET switch 234, and is also held as in the case of the previously described operation, on holding capacitor 280. The response of this channel is matched with that of the pulse rate system by summing it with an adjustable base reference voltage furnished by reference voltage supply 157. The lower acceptance limit, or cut-off point, to the compensated PIC voltage signal response for summing with the reference voltage is determined by the bias level applied to diode 164. The diode will pass only those signals which exceed the cut-off bias and then only to the extent that the signal exceeds the bias voltage. Transition from the compensated to the squared gamma-only PIC channel is indicated to occur somewhere between $10^{10}$ and $10^{11}$ nv. The exact point selected would be a matter to be determined by system optimization. The switchover, again, will be controlled by the mode selection and control system. However, when the squared gamma-only PIC mode is selected, its logarithmic signal will be sampled at the output of d.c. amplifier 358 by MOSFET switch 254. Again, the response of this channel is matched with that of the previous channels by the same method as described for the compensated PIC channel. However, here base reference voltage circuit 159 provides a pedestal onto which that portion of the gamma-only PIC response from log amplifier 331 exceeds the bias setting on diode 166. Thus, combining the responses of the three channels, yields an output for amplifier 282 at line 284 that spans approximately 18 decades of neutron flux/reactor power change.

Operational Mode Selector and Control Unit

The purpose of FIG. 3 was to show how to present to switches 214, 234 and 254 matched logarithmic response signals such that one could display a system of 18 decades. FIG. 3 does not deal with manual or automatic switching means and hence in FIG. 3 the means for operating the drivers 262, 264, and 266 to condition associated switches 214, 234 and 254 is not shown in or described in relation to FIG. 3.

However, in FIG. 8 suitable means is shown and will be described hereinafter to activate drivers 262, 264 and 266 in a manner to provide both manual and automatic operational mode selection and control of the three modes, Pulse Rate, Compensated Linear PIC, and Squared Gamma-only PIC. Selection between manual and automatic settings, and in manual setting the selection of the desired mode of operation is effected by manual/automatic mode selector means comprising a four-gang switch means having sections 360a, 360b, 360c and 360d, each section having a first position for manual pulse rate control, and second, third and fourth positions respectively for manual compensated PIC mode, manual squared gamma-only mode and automatic operation.

From a high level voltage source indicated at 362, high level voltages are supplied to switch section 360b at position 3, to switch section 360a at position 1, and to section 360c at its commutator 372. From a low level voltage source indicated at 364 low level voltages are supplied to switch section 360b at positions 1 and 2, and via a relay arm 374 to position 4. Low level voltage is also supplied from source 364 to section 360a at positions 2 and 3 and via a relay arm 376 to position 4.

In normal automatic operation, relay arms 374 and 376 are in the full time positions indicated in FIG. 8 and connect line sections 245 and 445 and 238 and 438 when communtator 371 is in number 4 (automatic) position. Arms 374 and 376 are operated from a relay indicated by coil 378 which is energized from a positive voltage source $V_{cc}$ and is controlled in operation from a bistable multivibrator 380 which conditions a transistor circuit 382 to conduct or not to conduct to ground indicated. When coil 378 is not energized the contact arms 376 and 374 are in the line connecting position indicated in FIG. 8. When coil 378 is energized the arms 376 and 374 are in dotted line position to provide low voltage input from source 364 to position 4 of each section 360b and 360a. Multivibrator 380 is activated to provide high voltage output to condition transistor 382 to "on" condition to energize coil 378 when the gang switches sections are in position number 4, supplying high voltage to set multivibrator 380 from high voltage source 362.

When the switch sections are set to position 4 and the relay coil 378 is activated to connect the low level voltage input 364 to switch position 4 in sections 360a and 360b, the system is then conditioned for compensated PIC mode operation only. In other words we have established a low voltage at line 445 which, via inverter 251, provides a high voltage at input 287 of gate 230. In like manner via switch section 360a, we have established a low level voltage at position 4 which places a low level voltage at line 438 which via inverter 211 produces a high voltage input on line 237 of gate 230. Therefore, with high voltage at both inputs 237 and 287 of gate 230, its output is high and conditions gate 236 to activate driver 264 to close switch 234, which provides the compensated PIC voltage input to T&H circuit 342.

Subsequent to this operation a delay pulse from master clock 377 via a delay means 379 is applied via line 201, switch section 360d, position 4, and line 384 to reset multivibrator 380. This deactivates transistor 382 and holding coil 378 to return the contactor arms 374 and 376 to the normal full time position shown in FIG. 8.

The reason for conditioning the system to compensated PIC mode operation as an initial step to automatic operation is to place the system in condition to remain in compensated PIC operation or automatically switch to Pulse Rate mode or Squared Gamma-only mode depending upon sensed voltage levels. For example, referring to FIG. 4, if the sensed voltage levels are in the shift zone represented by the compensated PIC range (FIG. 4a), no adjustment need take place and the system continues operation in this compensated PIC mode. If the sensed voltage levels are above the shift point between the compensated PIC mode and squared gamma only mode, the system then automatically shifts to Squared Gamma-only mode of operation (FIG. 4c). If the sensed voltage levels are below the shift poing between compensated PIC and Pulse Rate mode, the system then adjusts and shifts to the pulse rate mode of operation.

In shifting between PIC and pulse rate modes, it is necessary to operate switches indicated at 343 and 341 (FIG. 2), which is accomplished by a relay indicated by coil 306 (FIG. 8) and relay contacts incorporating the arms 341 and 343. The coil 306 is energized from $+ V_{cc}$ source indicated and is triggered via transistor 302 responsive to an input from AND gate 296 via resistor 298. The voltage at point 438 (FIG. 8) determines the voltage applied to the base of transistor 302. A high voltage energizes the transistor 302 to condition the switches 341 and 343 in position opposite that shown in FIG. 8 and such that the system is in the pulse rate mode of operation, i.e., the dotted line position of 341 and 343 shown in FIG. 2. When the voltage is low at point 438, the switches 341 and 343 are in the position shown in FIG. 8 (relay 306 is deenergized) and in the solid position shown in FIG. 2, such that the system is in the PIC mode of operation.

In considering the pulse sequences through which various elements of the system are sequentially operated, it is to be noted that the pulses are derived from the master clock 377 and several delay circuits 386, 388, 390, 392, 379 and 394. As shown in FIG. 2, clock 377 is connected through delay 386 to the high volt pulser 48, through delay 388 to the charging network 54, through delay 390 to common input 61 pulsing the drivers 146 and 147, through delay 392 to common input 63 supplying one input to gates 163, 164, 125, 127 and 167, through delay 379 (FIG. 8) to input line 201 serving drivers 200, 220 and 240 as well as section d of manually operated switch 360 and through delay 394 to common input line 203 providing one input to gates 216, 236 and 256.

Figure 13:
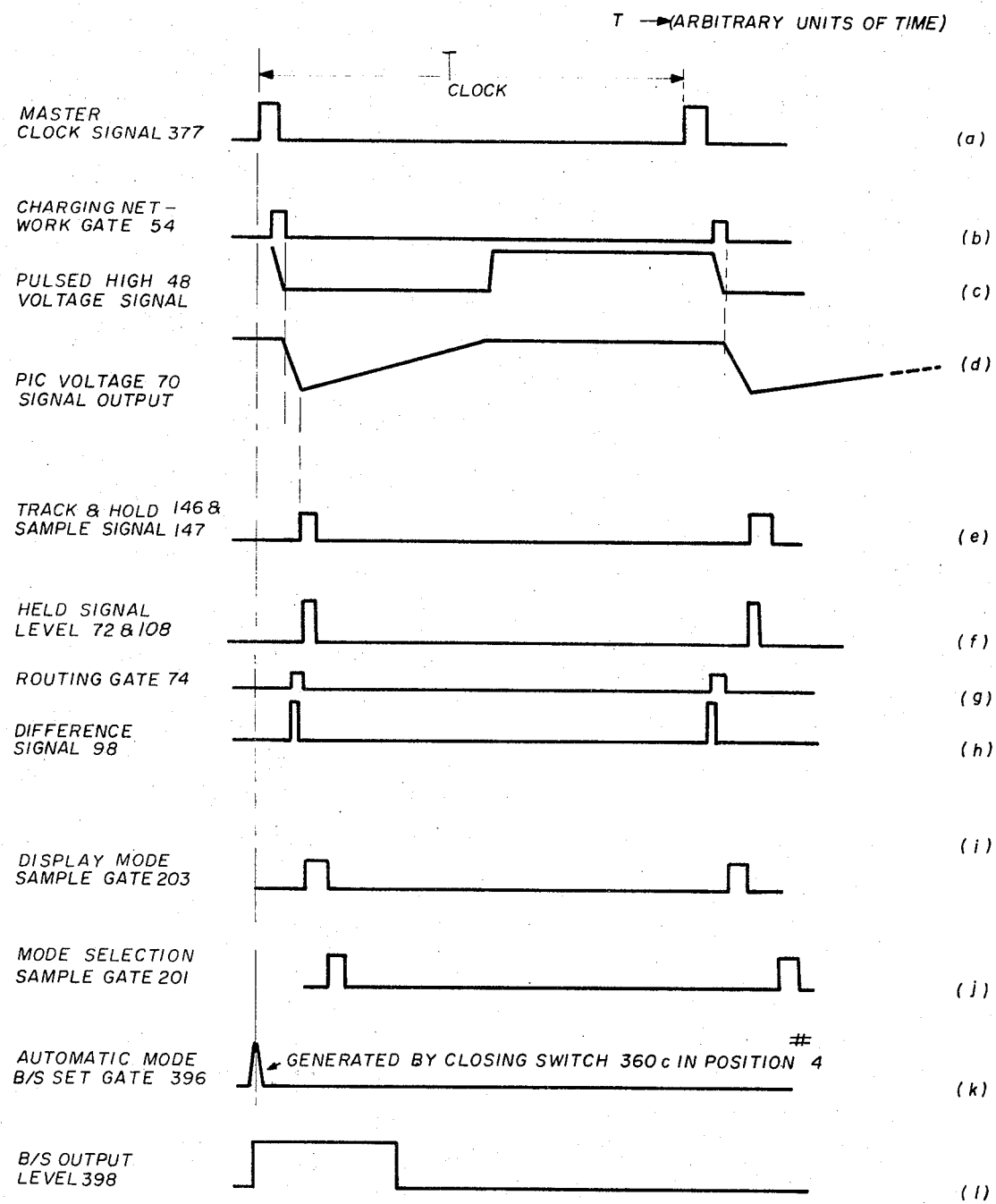
FIG. 13 is a set of curves, (a) –(1), provided to aid in understanding the pulse sequence obtained from operation of the circuit of FIG. 8 and also identifying the elements to which each curve relates.

To aid in understanding the pulse sequence obtained from the master clock 377 and from operation of the manual switch 360, FIG. 13 is provided with curves (a) through (l). Curve (a) shows the normal pulse rate of the clock 377. Curve (b) indicates the pulse supplied through delay 386 to charging network gate 54. Curve (c) shows the pulsed high voltage output pulse signal (negative polarity) from the high voltage pulser 48 resulting from clock 377 input pulse via delay means 386. Curve (d) is the PIC network output signal at the output of preamplifier 70. Curve (e) is the pulse delayed through delay means 390 and provided to drivers 146 and 147. Curve (f) is the held signal level output of T&H unit 72 and 108. Curve (g) is the pulse input to routing gate 74 via delay 392 and common line 63. Curve (h) is the difference signal found at the output of differential amplifier 98. Curve (i) is the input pulse via delay 394 and common line 203 to display sample gates 216, 236 and 256. Curve (j) is the input pulse via delay 379 and common line 201 to drivers 200, 220 and 240 and to section 360d of mode selection switch 360. Curve (k) is the set pulse generated by closing the arm 372 of switch section 360c on position 4 to set multivibrator 380. Curve (l) is the signal output of multivibrator 380 for controlling the "on" — "off" condition of transistor 382.

Considering now the elements and arrangement of elements shown in FIG. 8 and provided to effect automatic operation of the system via the control of drivers 262, 264 and 266 and their associated switches 214, 234 and 254, it is to be noted that three inputs, lines 212, 232 and 252 are provided and correspond to lines 132, 334 and 338 of FIG. 3.

Each of the three inputs 132, 334 and 338 of the Operational Mode Selection and Control Unit are provided with two MOSFET sampling switches. One set of three switches, i.e., 202, 222 and 242, one from each input, are coupled to T&H circuits 368, 370 and 373 whose outputs serve as the inputs of four comparator circuits 208, 218, 228 and 248 that are used to establish in which of the three signal voltage ranges (low, intermediate and high) the input signal levels are found to fall. The second set of three switches, i.e., 214, 234 and 254, are multiplexed to the input of a common T&H unit 342 and are used for sampling the input signal selected for Common Mode display.

As mentioned hereinbefore, the sampling operation of the mode selection T&H units 368, 370 and 373 is controlled and time-sequenced by basic clock pulse that appear at input 201 which is common to MOSFET driver circuits 200, 220 and 240. When pulsed simultaneously with a high level voltage, the driver circuits 200, 220 and 240 close their respective MOSFET switches 202, 222 and 242, initiating a sample and hold process for each of the mode input levels appearing on lines 338 (252), 334 (232) and 132 (212), and provides an essentially constant voltage level (updated with each pulse) at the comparator inputs 207, 217, 227 and 247. Gates 216, 236 and 256 are also provided with high level pulse at the basic clock rate at the common input 203. However, only one of the sample gates 216, 236 or 256 which has had its other input 215, 235 or 255 preconditioned to a high level state by the mode selection process during the previous pulse will be activated to sample and hold its respective input 213, 233 or 253 for Common Mode display.

Automatic Operation

When the AUTOMATIC operational mode is selected (FIG. 8) by selection of position 4 on gang switch 360 as described hereinbefore, comparators 208, 218, 228 and 248, and AND gates 210 and 250 are bypassed in mode selector switch 360a and 360b with low level voltages from voltage source 364 being applied at the inputs of state inverters 211 and 251 via lines 438 and 445, respectively. State inverters 211 and 251 invert their low level voltages at the two inputs of AND gate 230 via lines 237 and 287, respectively, causing the output of gate 230 to switch to high level. The high level state condition of AND gate 230, by preconditioning AND gate 236 with a high level at one of its inputs, is used to meet the gating requirement for coupling the compensated PIC system output 334 (233) with the Common Mode display system 300 via switch 234 and T&H 342.

The low level voltage appearing on lines 438 and 445 precondition AND gates 216 and 256 with low level inputs, via lines 215 and 255, respectively, thus holding the outputs of these gates at low level and resulting in conditioning MOSFET switches 214 and 254 to open condition thereby decoupling input 213 (pulse rate channel) and 253 (squared gamma-only PIC channel) from the Common Mode display system.

The appearance of a low level voltage on line 238, following the selection of position 4 on gang switch 360 via line 221, controls relay switches as described in detail hereinbefore to establish the system in the PIC mode, i.e., coupling the matched-pair ionization chambers to the high voltage pulser 48 and their anodes 44 and 38 to the PIC networks.

The reference voltages at inputs 209 and 219 for comparators 208 and 218, respectively, are set at a level which is intermediate between the output voltage of the high level limit of the pulse rate system 132 and the voltage level of the low level limit of the compensated PIC system 129 (334). While the reference voltages at inputs 229 and 249 for comparators 228 and 248, respectively, are selected intermediate between that of the upper limit of the compensated PIC range and an acceptable lower value of the squared gamma-only system 128 (338).

Compensated PIC Mode Operation

Once initiated, operation in the compensated PIC mode results in the outpuut voltage of the compensated PIC unit 129 (334) being sampled and applied at inputs 217 and 227 of comparators 218 and 228, respectively, and that from the squared gamma-only unit 128 (338) appearing at input 247 of comparator 248. If the signal voltage level detected by the comparators is above the reference voltage at point 219 for comparator 218, but below the reference levels at points 229 and 249 for comparators 228 and 248, respectively, no change will occur in their state levels or that of the gates they control, allowing the system to remain and operate in the compensated PIC mode. However, if the voltage sensed at input 217 of comparator 218 falls below the level of its reference voltage at point 219, its output at point 265 will change from a low to a high level stage, causing the output of AND gate 210 at point 238 to also shift to a high level state (Input 205 to gate 210, based on the output state of comparator 208, will be in its high level state since its input 207 will be essentially at zero.). This state change is inverted by state inverter 211 to a low level at input 237 of AND gate 230, causing its output, line 235, to shift to low level, carrying with it the input (also 235) to AND gate 236 and preconditions this gate for low level output only, thus decoupling the compensated PIC input line 233 from the Common Mode Display system 300. As output 238 of gate 210 goes to high level, it activates the relay switches 341 and 343 to decouple the $n + \gamma$ chamber 36 from the PIC network and establishes the coupling with the pulse rate system by closing switch 343. This transition also couples the pulse rate system input 213 inot the Common Mode Display unit 300 by providing a high level preconditioning input at point 215 to AND gate 216. When the system is activated in the aforementioned pulse rate mode, the pulse rate output voltage at point 132, when properly adjusted and sampled-and-held- by its respective T&H unit 368 at input 207 of comparator 208, will fall below the reference voltage of the comparators other input 209. Under these circumstances the output of comparator 208 will be in its high level state. The output of comparator 218 will also be in its high level state, since the compensated PIC signal voltage at input 217, falling to the pedestal voltage (see FIGS. 3 and 4b) when the system is switched from PIC to pulse rate mode, drops and stays below the reference voltage at input 219. The high levels from the outputs of the two comparators 208 and 218, appearing simultaneously at inputs 205 and 265, holds the output of AND gate 210 in its high level state and preconditions sampling gate 216 with a high level input on line 215 to hold the system in the pulse rate mode.

Should the pulse rate voltage level at input 207 of comparator 208 again rise above its reference level at point 209, its output level at 205 will switch back to the low level state automatically, reversing the above process and restoring the system to the compensated PIC mode.

While the system is operating in the pulse rate mode, the high level state of the output of AND gate 210, inverted by state inverter 211, provides a low level input to AND gate 230, holding its output to low level, preconditioning sampling gate 236 to hold MOSFET switch 234 in an open condition. Also, the high level outputs of comparators 228 and 248, inverted to low levels at the inputs of AND gate 250 by state inverters 231 and 241, respectively, establishes the output 245 of this gate to its low level state, and preconditions sample gate 256 to hold MOSFET switch 254 in an open condition.

Squared Gamma-Only PIC Mode Operation

When the compensated PIC operation is initiated upon selection of AUTOMATIC operation, if the voltage levels at 227 and 247 to inputs of comparators 228 and 248 exceed their reference levels at inputs 229 and 249, respectively, the outputs of the comparators 228 and 248 will switch from high to low level states. These levels will be inverted by state inverters 231 and 241 to high levels at the two inputs to AND gate 250, causing its output 245 to follow, switching to high level. The output of gate 250 is inverted to low level by state inverter 251 and is applied to input 287 of AND gate 230, causing its output to switch to low level, thus preconditioning sampling gate 236 to a low level, holding open MOSFET switch 234 and decoupling the compensated PIC system from the Common Mode Display system. Simultaneously, output 245 of AND gate 250, going to its high level state, preconditions sampling gate 256 to a high level state and activates it for the closing of MOSFET switch 254 and the coupling of the squared gamma-only PIC input to the Common Mode Display. This mode will remain activated until either input 227 or 247 to comparators 228 and 248 drop below their respective reference levels. When the latter occurs, it will cause one of the inputs of the AND gate 250 to drop to low level, causing the output of the gate to also revert to low level, changing the preconditioning of sampling gate 256 to low level, thus breaking the coupling of the squared gamma-only PIC input with the Common Mode Display, and reestablishing the system to the compensated PIC mode of operation. It should be noted that, in order for the system to be switched from the compensated PIC to squared gamma-only PIC mode, both comparator reference levels must be exceeded, otherwise, AND gate 250 will not change states, leaving the system in the former mode off operation.

Signal Routing and Processing Sequence

Once the appropriate mode of operation has been established by the Operational Mode Selector and Control System (FIG. 8), the selection and routing of the correct voltage for Common Mode Display is accomplished by use of the states of the routing and sampling gates developed during mode selection.

A convenient method for accomplishing this is to multiplex MOSFET sampling switches 214, 234 and 254 into the input of common sample and hold unit 342, with the "open" or "closed" state of the appropriate switch being controlled by the state of its respective sampling gate. The three sampling gates 216, 236, 256 are pulsed simultaneously at the basic pulse rate of the system clock 377. The gating for input display selection is furnished by the states of the Mode Selection gates 216, 236 and 256, established by the immediately preceding pulse. The previously selected mode gate levels establish the preconditioning states of sampling gates 216, 236 and 256 as described earlier. High level preconditioning, combined with high level pulses from the clock at common input point 203 serves to generate a logic pulse input to the appropriate switch driver circuit 262, 264 or 266, to switch "on" MOSFET sampling switches 214, 234 or 254 respectively, for sampling its respective voltage level signal at the appropriate input 253, 233 or 213, for holding as the input for the Common Mode Display unit. The level of the appropriate T&H unit is held and displayed until it is updated by the next pulse of the operational sequence control system.

As previously described, siumltaneously, but with a preset delay, the mode selection T&H units, whose outputs are coupled to the comparator circuits, sample and hold the levels for establishing the mode of operation for the next pulse. The mode selection, based on the latter output levels, establish the gating requirements for the next pulse that follows in the sequence.

To illustrate the operation, examples are cited below:

If the mode selected by the previous pulse is that for compensated PIC operation and no change occurs in the mode selection process, the input is routed to the Common Mode Display and the mode selection system remains unchanged. However, if the mode selection process detects a change in input level and switches mode, the gating requirements for displaying the level of the input of the next pulse will be shifted to that of the updated mode.

For example, if the system is operating in the compensated PIC mode and the selection process notes that the input level to comparator 218 is below its reference level, the compensated PIC level will have been sampled by the display T&H unit and will be displayed on the Common Mode Display unit. After the present delay, the mode selection T&H units will be pulsed, and in sampling the input level for comparator 218, will cause a transfer of operation to the Pulse Rate mode, so that for the next pulse of the sequence the system will be operating in the Pulse Rate mode with MOSFET switch 214 of the display T&H unit 342 being gated "on" for sampling the Pulse Rate input, which will be displayed until the input level at comparator 208 goes above its reference level. Transfer between other modes will follow the same sequence, with the level sensed being sampled and displayed, followed by a transfer of mode for the next pulse of the sequence.

Figure 10:
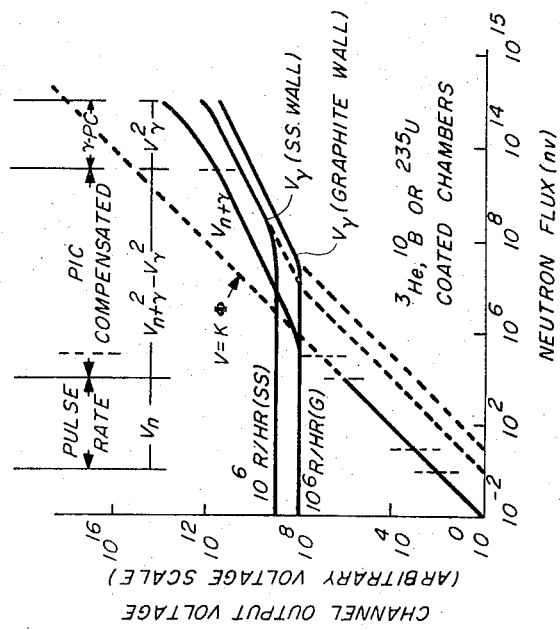
FIGS. 9 and 10 are two voltage/flux charts showing two proposed schemes of application of the invention under differing circumstances.
Figure 9:
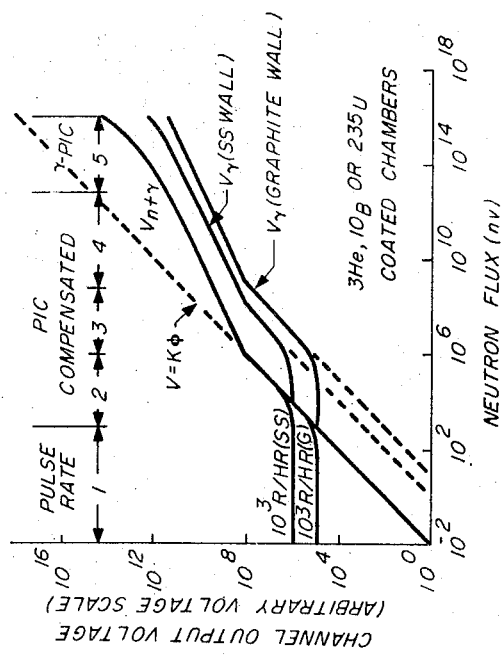

Based upon the operational performance of the system as per FIG. 2, a further aspect of my invention contemplates two schemes of selection and arrangement of elements as shown in FIGS. 9 and 10, involving two different levels of gamma field intensities.

The first of the two schemes, shown in FIG. 9, involves measurements with systems having near zero, or relatively low, fission product inventories. Uncompensated or compensated linear PIC operation of the neutron sensitive sensor can range from approximately $10^2$ to $10^{12-13}$ nv range, whereas this range can be extended into the $10^{15-16}$ nv range by use of the squared signal voltage of the gamma-only sensitive chamber. The two fission product gamma levels reflect those expected for: (1) current conventional stainless steel ionization chambers operated in an approximately $10^3$ R/hr gamma radiation field, or (2) an optimized system, possibly having a low density, low Z graphite chamber wall. High pulse rate systems with the neutron sensitive sensor could cover the range from approximately $10^{-2}$ to $10^6$ nv.

The second operational scheme, shown in FIG. 10, involves measurement with fission product gamma fields of approximately $10^5 - 10^6$ R/hr. Under such conditions, the two chambers will be operating within the second order kinetics region, even at the lowest neutron flux/reactor power levels, due to gamma ionization of the chamber gas. Again, the two gamma radiation levels reflect that expected for conventional stainless steel chambers and the graphite wall or better systems for optimization. Depending on the gamma radiation field, and 99 percent gamma compensation, dependable PIC operation can commence at a flux level of either $10^4$ or $10^5$ nv. Second order PIC compensation would be applicable from these values up to approximately $10^{12-13}$ nv and the $v_\gamma{}^2$ signal would carry the linear performance into the $10^{15-16}$ nv range. The pulse rate system, using the neutron plus gamma portion of the sensor, would furnish a flux measurement capability ranging from approximately $10^{0-2}$ nv to $10^{5-6}$ nv.

A further aspect of my invention relates to an additional improvement in a PIC mode operated reactor system in the area of high temperature operational characteristics and the concept and formulation of neon fill-gas compositions for temperature independent PIC mode operation. PIC mode operation with the common ion chamber fill-gas compositions, i.e., $He-CO_2$, $He-N_2$ and $Ar-N_2$, involves a temperature dependent shift of the output voltage signal due to an inverse temperature dependence of the ionization loss coefficient characteristic of the gas composition. To prevent the above condition, I provide the use of neon as a fill-gas or fill-gas constituent for fission and boron coated chambers, or as a trace constituent with other gases such as $^3$He that are neutron sensitive. The result of the neon applications as described above have been temperature independence of ionization loss coefficient and the desired temperature independent PIC mode operation. Such temperature independent characteristics are essential for power reactor instrumentation, where the operating temperature will vary with the reactor power level.

In summary, applicant has provided an improved pulsed reactor system incorporating a single, gamma compensated sensor system with approximately an 18-decade neutron flux measurement capability, from approximately $10^{-2}$ to $10^{16}$ nv, which can be operated satisfactorily at elevated temperatures of approximately 1,000° F, and gamma radiation fields of approximately $10^6$ R/hr with 99 percent compensation.

The favoravle high temperature characteristics of applicant's improved PIC system, its wide-range, linear, gamma compensation, in-core measurement, multisensor-array sequencing and computer control capabilities answer many of the requirements of present day thermal reactor systems and the new breed of high temperature breeder reactors that are being developed.

What is claimed is:

1. In a nuclear atomic reactor power/neutron flux measurement system of the pulsed high voltage ionization chamber type the improvement comprising:

a. a single sensor system with separate chambers of neutron plus gamma and gamma-only sensitivity respectively for providing separate output voltages responsive to pulsed voltage ionization technique and including a single-pole high voltage pulser means and a charging network connected to a pulse generating timing means and delay means to provide a field-free period for ionization density build-up signal enhancement and pulsed voltage ionization collection polarization from said pulser means, and
b. differential circuit means connected to receive said output voltages and to provide as a difference voltage output signal a neutron only voltage value effecting gamma field compensation, constituting a compensated pulsed ion chamber channel.

2. Apparatus according to claim 1
a. said differential circuit means including amplifier means, comparator means, and amplifier inverter means connected to receive said respective chamber output voltages and provide an amplified voltage and an amplified inverted voltage and
b. a differential amplifier connected to receive said amplified voltage outputs and provide a difference output signal eliminating the effect of gamma field.

3. Apparatus according to claim 2 including
a. a linear gate means connected to sample said differential amplifier difference output signal at its maximum amplitude,
b. a track and hold module connected to receive the output signal of said linear gate and hold the sampled maximum voltage until the next pulse arrives at said track and hold module from said linear gate and
c. voltage display means connected to receive and display the voltage level of said track and hold module.

4. In a nuclear atomic reactor power measurement system of the pulsed high voltage ionization chamber type the improvement comprising
a. a single sensor system with separate chambers of neutron plus gamma and gamma-only sensitivity respectively providing separate output voltages responsive to pulsed voltage ionization technique and
b. differential circuit means connected to receive said output voltages and to provide as a difference voltage output signal a neutron only voltage value effecting gamma field compensation, constituting a compensated pulsed ion chamber channel,
c. a squaring functions electronic circuit for each of said chambers and an operational mode selector,
d. each of said squaring functions circuits including a chamber voltage sample and hold means, routing gate means, a comparator means and a squaring circuit connected for activation from said sample and hold means,
e. said routing gate means having one input connected to derive voltage directly from its associated chamber and a second input connected to receive voltage from said squaring circuit,
f. said comparator means being connected to receive inputs from said sample and hold means and from said squaring circuit and connected to provide an input to said routing gate means,
g. said routing gate means being connected to provide an input to said differential amplifier and being set to switch from a signal derived directly from said sample and hold means and corresponding to a first order region of radiation fields response constituting a compensated pulsed ion chamber channel, to a second order higher radiation fields response in a squared gamma only channel mode to assure that only signals which are varying directly with the source of ionization rate will appear at the differential amplifier inputs,
h. a second input to said operational mode selector being received from said squaring circuit of said gamma-only circuit, and
i. said operational mode selector being operable to switch to the gamma-only squaring circuit signal which will then be responding to prompt-fission gammas, and thereby continue the linear response of the system.

5. Apparatus according to claim 4 including
a. a high performance pulse rate system connected to operate on said neutron plus gamma sensitive chamber and to provide a third input to said operational mode selector to provide a low neutron flux measurement capability over a range of approximately $10^{-2}$ to $10^6$ neutrons/cm$^2$ sec, thus constituting a pulse rate mode channel.

6. Apparatus according to claim 1 wherein
a. said chambers are provided with neon as a fill-gas component for fission and boron coated chambers and as a trace constituent with other gases that are neutron sensitive to provide temperature stabilization of the pulsed ionization chamber voltage signals under temperature variant conditions.

7. Apparatus according to claim 5, said operational mode selector including
a. channel switch means having gated drivers for selectively connecting said respective channels to a display unit,
b. operational control switch means and relay switch means,
c. said operational control switch means having a first, second and third positions for manual selection of said operation mode in any of said three channel modes and a fourth position by passing the effect of said first three switch positions and placing the system in automatic operation for control by said comparators, inverters and gated drivers responsive to the relative values of output voltages from said chambers for selection between said pulse rate, compensated pulsed ion chamber and squared gamma-only channels.

8. Apparatus according to claim 5, including
a. log ratemeter means connected in said pulse rate mode channel and log amplifier and operational amplifier means connected in said compensated pulse ion channel and in said squared gamma only channel for converting linear response characteristics of each channel into logarithmic response.

* * * * *